United States Patent
Probert et al.

(10) Patent No.: US 9,620,015 B2
(45) Date of Patent: Apr. 11, 2017

(54) KINEMATIC PATH PREDICTION OF VEHICLES ON CURVED PATHS

(71) Applicant: Nissan North America, Inc., Franklin, TN (US)

(72) Inventors: Neal Probert, Farmington Hills, MI (US); Roy Goudy, Farmington Hills, MI (US); Andrew Christensen, South Lyon, MI (US); Jeremy Chambers, Casco, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/797,402

(22) Filed: Jul. 13, 2015

(65) Prior Publication Data

US 2017/0018186 A1   Jan. 19, 2017

(51) Int. Cl.
*G01C 22/00* (2006.01)
*G08G 1/16* (2006.01)
(Continued)

(52) U.S. Cl.
CPC ............ *G08G 1/163* (2013.01); *G01C 21/34* (2013.01); *G05D 1/0212* (2013.01); *G08G 1/166* (2013.01); *G05D 2201/0212* (2013.01)

(58) Field of Classification Search
CPC . G08G 1/0967; G08G 1/09626; H04W 4/046; G01C 21/26
(Continued)

(56) References Cited

U.S. PATENT DOCUMENTS 5,939,976 A   8/1999   Sasaki et al.
5,940,010 A   8/1999   Sasaki et al.
(Continued)

FOREIGN PATENT DOCUMENTS

JP   2001118199 A   4/2001
JP   2003051099 A   2/2003

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of The Ohio State University, Mar. 2012, UMI/Proquest Pub. No. 3497707, 136 pages (total).
(Continued)

*Primary Examiner* — Gertrude Arthur Jeanglaud
(74) *Attorney, Agent, or Firm* — Young Basile Hanlon & MacFarlane, P.C.

(57) ABSTRACT

A host vehicle receives a remote vehicle message via a wireless electronic communication link. The remote vehicle message includes remote vehicle information indicating remote vehicle geospatial state information and remote vehicle kinematic state information that includes at least a remote heading angle for a remote vehicle. Host vehicle information is identified that includes host vehicle geospatial state information and host vehicle kinematic state information that includes at least a host heading angle for the host vehicle. Projected vehicle transportation network information representing a portion of the vehicle transportation network is generated based on the remote and host vehicle information, the portion including a curved path having a substantially constant radius. An expected host vehicle route for the host vehicle is determined in response to generating the projected vehicle transportation network information
(Continued)

representing the curved path, and the host vehicle traverses the curved path using the expected host vehicle route.

20 Claims, 28 Drawing Sheets

(51) Int. Cl.
*G01C 21/34* (2006.01)
*G05D 1/02* (2006.01)

(58) Field of Classification Search
USPC .............. 701/2, 25, 96, 301, 400, 416, 29.2; 340/903, 905
See application file for complete search history.

(56) References Cited

U.S. PATENT DOCUMENTS

| | | | |
|---|---|---|---|
| 6,008,741 A | 12/1999 | Shinagawa et al. | |
| 6,615,137 B2 | 9/2003 | Lutter et al. | |
| 6,700,504 B1 | 3/2004 | Aslandogan et al. | |
| 6,720,898 B1 | 4/2004 | Ostrem | |
| 6,791,471 B2 | 9/2004 | Wehner et al. | |
| 6,810,328 B2 | 10/2004 | Yokota et al. | |
| 7,363,117 B2 * | 4/2008 | Tengler | G01C 21/26 340/903 |
| 8,000,897 B2 | 8/2011 | Breed et al. | |
| 8,175,796 B1 | 5/2012 | Blackburn et al. | |
| 8,229,663 B2 | 7/2012 | Zeng et al. | |
| 8,290,704 B2 * | 10/2012 | Bai | G01C 21/32 340/991 |
| 8,340,894 B2 | 12/2012 | Yester | |
| 8,466,807 B2 | 6/2013 | Mudalige | |
| 8,548,729 B2 | 10/2013 | Mizuguchi | |
| 8,577,550 B2 | 11/2013 | Lu et al. | |
| 8,587,418 B2 | 11/2013 | Mochizuki et al. | |
| 8,639,426 B2 | 1/2014 | Dedes et al. | |
| 8,717,192 B2 | 5/2014 | Durekovic et al. | |
| 2007/0109111 A1 | 5/2007 | Breed et al. | |
| 2007/0262881 A1 | 11/2007 | Taylor | |
| 2009/0033540 A1 | 2/2009 | Breed et al. | |
| 2009/0140887 A1 | 6/2009 | Breed et al. | |
| 2009/0198412 A1 | 8/2009 | Shiraki | |
| 2010/0169009 A1 | 7/2010 | Breed et al. | |
| 2012/0016581 A1 | 1/2012 | Mochizuki et al. | |
| 2012/0218093 A1 | 8/2012 | Yoshizawa et al. | |
| 2013/0099911 A1 | 4/2013 | Mudalige et al. | |
| 2013/0116915 A1 | 5/2013 | Ferreira et al. | |
| 2013/0179047 A1 | 7/2013 | Miller et al. | |
| 2013/0278440 A1 | 10/2013 | Rubin et al. | |

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

* cited by examiner

KINEMATIC PATH PREDICTION OF VEHICLES ON CURVED PATHS

TECHNICAL FIELD

This disclosure relates to vehicle operation, including routing and navigation.

BACKGROUND

A vehicle may include a control system that generates and maintains a route of travel and may control the vehicle to traverse the route of travel. For example, an autonomous vehicle may be controlled autonomously, without direct human intervention, to traverse a route of travel from an origin to a destination. With both autonomous vehicles and non-autonomous vehicles, it is desirable to know the distance between vehicles for identifying intersections, producing warnings, etc.

SUMMARY

Disclosed herein are aspects, features, elements, implementations, and embodiments of determining a path length between vehicles along a curve.

An aspect of the disclosed embodiments is a method of generating projected vehicle transportation network information for use in traversing a vehicle transportation network. The method may include receiving, from a remote vehicle, a remote vehicle message, the remote vehicle message including remote vehicle information, the remote vehicle information indicating remote vehicle geospatial state information for the remote vehicle and remote vehicle kinematic state information for the remote vehicle, the remote vehicle kinematic state information including at least a remote heading angle for the remote vehicle. The remote vehicle message may be received at a host vehicle via a wireless electronic communication link. The method may also include identifying host vehicle information for the host vehicle, the host vehicle information including host vehicle geospatial state information and host vehicle kinematic state information for the host vehicle, the host vehicle kinematic state information including at least a host heading angle for the host vehicle. Projected vehicle transportation network information representing a portion of the vehicle transportation network may then be generated based on the remote vehicle information and the host vehicle information, the portion including a curved path having a substantially constant radius. The method also includes determining an expected host vehicle route for the host vehicle in response to generating the projected vehicle transportation network information representing the curved path, and traversing, by the host vehicle, the curved path using the expected host vehicle route.

Another aspect of the disclosed embodiments is a host vehicle that includes a processor configured to execute instructions stored on a non-transitory computer readable medium to generate projected vehicle transportation network information for use in traversing a vehicle transportation network. The processor generates the projected vehicle transportation network information for use in traversing a vehicle transportation network by receiving, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle, the remote vehicle kinematic state information including at least a remote heading angle for the remote vehicle, identifying host vehicle information for the host vehicle, the host vehicle information including host vehicle geospatial state information and host vehicle kinematic state information for the host vehicle, the host vehicle kinematic state information including at least a host heading angle for the host vehicle; generating projected vehicle transportation network information representing a portion of the vehicle transportation network based on the remote vehicle information and the host vehicle information, the portion including a curved path having a substantially constant radius, determining an expected host vehicle route for the host vehicle in response to generating the projected vehicle transportation network information representing the curved path, and traversing the curved path using the expected host vehicle route.

Variations in these and other aspects, features, elements, implementations and embodiments of the methods, apparatus, procedures and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
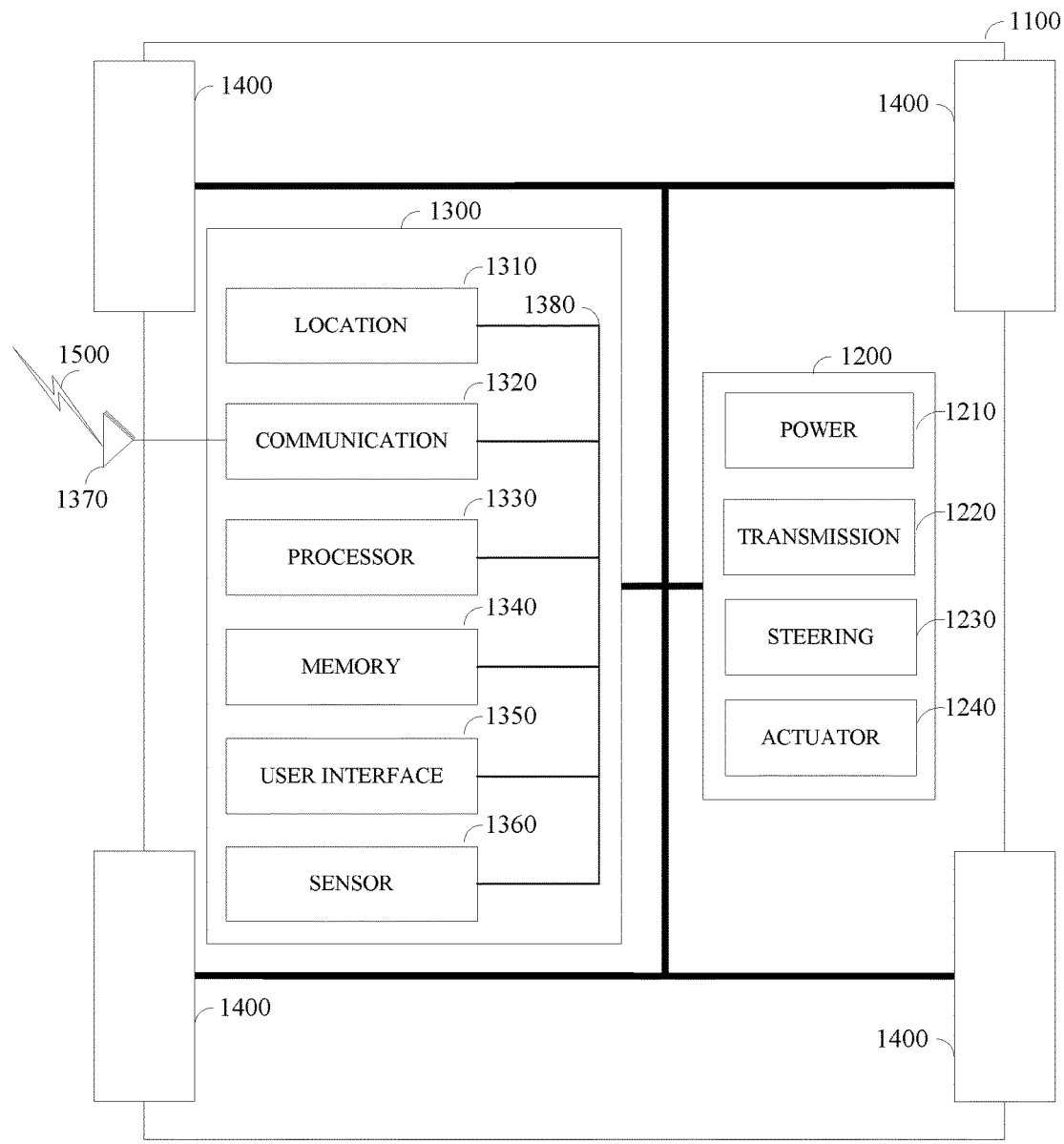
FIG. 1 is a diagram of an example of a portion of a vehicle in which the aspects, features and elements disclosed herein may be implemented.

A vehicle may travel from a point of origin to a destination in a vehicle transportation network. When vehicles are traveling in the vehicle transportation network, collisions are possible.

Commercially available collision warning systems rely on detection and ranging systems to determine whether a collision is imminent. These systems (e.g., SONAR, RADAR, LIDAR) work well for stationary objects. However, these systems lack the ability to discern driver intent and require line of sight between objects, making them less than optimal for collision avoidance between moving vehicles.

Collision warning systems may be based on vehicle-to-vehicle (V2V) exchange of a basic safety message containing location and trajectory information, which does not require line of sight between vehicles. One way in which to use the information within the message is to first correlate the information to map data to determine an actual location before making a potential collision determination. However, correlation to map data is time and resource intensive, and accurate and timely collision warnings may be hampered by a lack of resolution.

An alternative technique involves a converging path determination. While still using global positioning system (GPS) coordinate location data from the message, a determination may be made as to whether first and second vehicles (e.g., a host vehicle and a remote vehicle) are on converging paths—paths that intersect in the direction of their trajectories—or are on diverging paths—paths that do not intersect in the direction of their trajectories. Using a predetermined coordinate layout, a straight line between the host vehicle and remote vehicle is determined, as well as an angle between the host vehicle trajectory and the straight line. The determination of whether the vehicles are on converging or diverging paths may then be made knowing the vehicle locations, trajectories, the straight line and the angle.

Vehicles may be traveling along a curved path within the vehicle transportation network. When determining a distance between vehicles (also called path length herein), it is desirable to take the radius of curvature into account. As compared to a straight-path distance, the true path length is larger. As the radius of curvature increases, this difference becomes larger. Thus, the warning application on the host vehicle estimates that the remote vehicle is closer than it actually is. This may produce false alarms. Conventionally, the radius of curvature may be determined by dividing yaw rate by speed. This calculation may be more inaccurate the smaller the radius of curvature.

In contrast, the teachings herein describe how data from the host vehicle and remote vehicle safety message may be used to identify the radius of curvature from a plurality of possible scenarios involving direction of the curve and heading angles for the vehicles. The path length between the vehicles can be determined using the radius of curvature, thus more accurately timing possible warnings or threat mitigation operations if needed. The information may also be used to identify vehicle transportation network information, such as the curved shape of the roadway. Based on the calculated curve, the host vehicle can easily determine future points along the path and then compare its current position with these predicted positions. The teachings herein provide an accurate measure of distance between the host and remote vehicles without relying on momentary yaw rates or complicated and time-consuming calculations to correlate with map data.

Further, using GPS position and heading, a more stable prediction of vehicle heading over methods that use instantaneous values of yaw rate and speed is provided. Details are described below in conjunction with a description of the environments in which the teachings herein may be implemented.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature" or "element" indicates serving as an example, instance or illustration. Unless expressly indicated, any example, embodiment, implementation, aspect, feature or element is independent of each other example, embodiment, implementation, aspect, feature or element and may be used in combination with any other example, embodiment, implementation, aspect, feature or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature or element may be used independently or in various combinations with or without other aspects, features and elements.

FIG. 1 is a diagram of an example of a vehicle 1000 in which the aspects, features and elements disclosed herein may be implemented. In some embodiments, the vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300 and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both, and may control the wheels 1400 to steer the vehicle 1000. The actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof, may be integrated in one or more electronic units, circuits or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium capable of, for example, containing, storing, communicating, or transporting machine-readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface 1370 may be configured to communicate via multiple communication links.

The communication unit 1320 may be configured to transmit or receive signals via the wired or wireless medium 1500, such as via the communication interface 1370. Although not explicitly shown in FIG. 1, the communication unit 1320 may be configured to transmit, receive, or both, via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and/or a touch display for performing visual and touch-based communication with the person.

The sensor 1360 often includes one or more sensors 1360, such as an array of sensors, which may be operable to provide information that may be used to control the vehicle 1000. The sensor 1360 may provide information regarding current operating characteristics of the vehicle. When multiple sensors 1360 are included, they can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include one or more sensors that are operable to obtain information regarding the physical environment surrounding the vehicle 1000. For example, one or more sensors 1360 may detect road geometry and obstacles, such as fixed obstacles, vehicles and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof. The trajectory controller may be implemented, at least in part, using one or more elements of the controller 1300.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, the vehicle 1000 may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
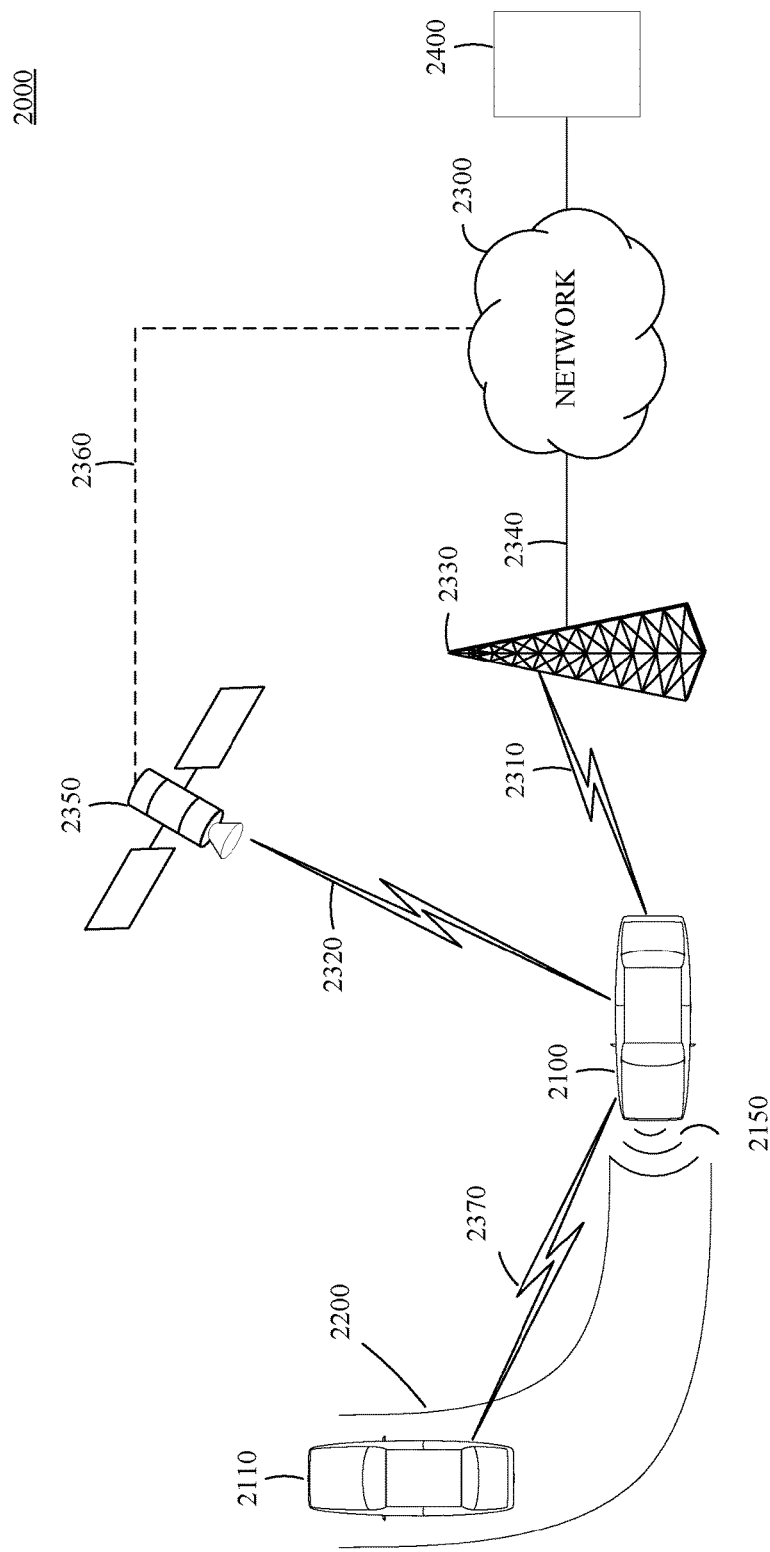
FIG. 2 is a diagram of an example of a portion of a vehicle transportation and communication system in which the aspects, features and elements disclosed herein may be implemented.

FIG. 2 is a diagram of an example of a portion of a vehicle transportation and communication system in which the aspects, features and elements disclosed herein may be implemented. The vehicle transportation and communication system 2000 may include at least two vehicles 2100/2110, each of which may be configured similarly to the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between each vehicle 2100/2110 and one or more communicating devices 2400. For example, a vehicle 2100/2110 may receive information, such as information representing the vehicle transportation network 2200, from a communicating device 2400 via the network 2300. In certain embodiments described herein, the electronic communication network 2300 can be used in vehicle-to-vehicle communication of the basic safety message containing location and trajectory information of the vehicle 2100. Each vehicle 2100/2110 may also communicate this information directly to one or more other vehicles as discussed in more detail below.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as the basic safety message, from a remote, or target, vehicle (RV) 2110, via a direct communication link 2370, or via the network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically based on a defined interval, such as 100 milliseconds.

Automated inter-vehicle messages may include vehicle identification information, geospatial state information, such as longitude, latitude and/or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmitting vehicle is in a neutral state, a parked state, a forward state or a reverse state.

In some embodiments, the vehicle 2100 may communicate with the communication network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communication network 2300 via a satellite 2350, or other non-terrestrial communication device. The satellite 2350, which may include a computing device, may be configured to communicate with the vehicle 2100, with the communication network 2300, with one or more communication devices 2400, or with a combination thereof via one or more communication links 2320/2360. Although shown as a single unit, a satellite may include any number of interconnected elements.

The vehicle 2110 may similarly communicate with the communication network 2300 via the access point 2330 and/or the satellite 2350.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2150, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle transportation network 2200, one electronic communication network 2300, and one communication device 2400, any number of networks or communication devices may be used. In some embodiments, the vehicle transportation and communication system 2000 may include devices, units or elements not shown in FIG. 2. Although each vehicle 2100/2110 is shown as a single unit, a vehicle may include any number of interconnected elements.

Although the vehicle 2100 is shown communicating with the communication device 2400 via the network 2300, the vehicle 2100 and/or the vehicle 2110 may communicate with the communication device 2400 via any number of direct or indirect communication links. For example, each vehicle 2100/2110 may communicate with the communication device 2400 via a direct communication link, such as a Bluetooth communication link.

Figure 3:
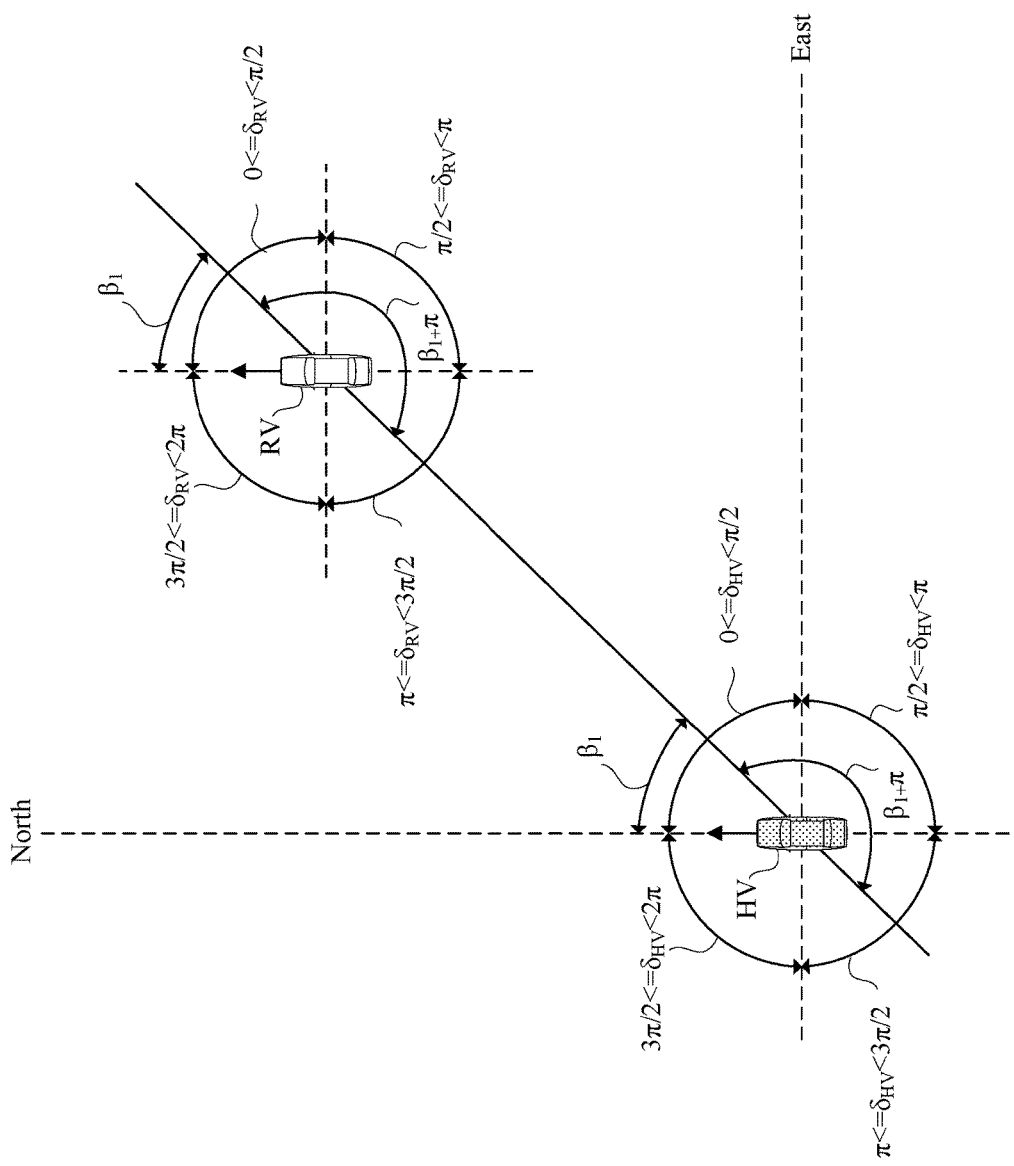
FIG. 3 is a diagram of identifying inter-vehicle state information including a geodesic for use in generating projected vehicle transportation network information in accordance with this disclosure.

FIG. 3 is a diagram that explains terminology used herein. More specifically, FIG. 3 is a diagram of identifying inter-vehicle state information including a geodesic for use in generating projected vehicle transportation network information in accordance with this disclosure. Identifying inter-vehicle state information may be implemented in a vehicle, such as the vehicle 1000 shown in FIG. 1 or the vehicles 2100/2110 shown in FIG. 2.

In FIG. 3, a host vehicle HV is shown with stippling and a remote vehicle RV is shown in white for ease of reference. For simplicity, FIG. 3 is oriented with north at the top as a reference direction and with east at the right side. Data between vehicles may be transmitted within a defined geospatial range. In some embodiments, the defined geospatial range is approximately 300 meters; however, other ranges may be possible. Although elevation is not expressly shown in FIG. 3, elevation information may be used for generating projected vehicle transportation network information.

In some embodiments, the host vehicle HV may traverse a portion of a vehicle transportation network (not shown in FIG. 3), may receive automated inter-vehicle communications from one or more remote vehicles RV within the defined geospatial range, and may transmit automated inter-vehicle communications to one or more remote vehicles RV within the defined geospatial range. An automated inter-vehicle communication received by a host vehicle from a remote vehicle may be referred to herein as a remote vehicle message. For example, the host vehicle may receive the remote vehicle messages via a wireless electronic communication link, such as the wireless electronic communication interface 1370 shown in FIG. 1.

In some embodiments, the automated inter-vehicle messages may indicate information such as geospatial location information and heading information. In some embodiments, the host vehicle HV may transmit one or more automated inter-vehicle messages including host vehicle information, such as host vehicle heading information. Similarly, the remote vehicle RV may transmit one or more automated inter-vehicle messages including remote vehicle information, such as remote vehicle heading information.

In some embodiments, the host vehicle HV may identify a host vehicle expected path for the host vehicle HV based on host vehicle information, such as host vehicle geospatial state information and host vehicle kinematic state information. In some embodiments, the host vehicle HV may identify a remote vehicle expected path for a remote vehicle RV based on the automated inter-vehicle messages, which may include remote vehicle information, such as remote vehicle geospatial state information and remote vehicle kinematic state information. This information may be used to generate projected vehicle transportation network information.

According to the description of the teachings herein, the host vehicle RV is assumed to be on a curved path following a remote vehicle RV on the curved path. The curved path is an example of projected vehicle transportation network information. FIG. 3 shows the possible angular ranges for each of the host vehicle heading angle $\delta_{HV}$ measured from the reference direction and the remote vehicle heading angle $\delta_{RV}$ from the reference direction. The possible angular ranges are defined relative to an orientation sector, which may indicate a quantized geospatial location, or direction, of a remote vehicle, relative to the host vehicle, in the geospatial domain. In some embodiments, locations relative to the host vehicle location may be quantized into a defined number, quantity, count or cardinality, of orientation sectors. As described herein, for example, the defined set of orientation sectors includes four orientation sectors, or quadrants, which may include ninety degrees each. However, any number, size and direction of orientation sectors may be used.

The defined set of orientation sectors may be identified in the geospatial domain relative to the host vehicle HV and a reference direction, which is north in this example. The reference direction may alternatively correspond to the host vehicle heading angle $\delta_{HV}$. As seen in FIG. 3, the reference direction, relative to the host vehicle, is north and corresponds with zero degrees (0°, 360°, 2π), east corresponds with ninety degrees (90°, π/2), south corresponds with 180 degrees (180°, π), and west corresponds with 270 degrees (270°, 3π/2). Thus, orientation sectors Q may include a first orientation sector $Q_1$ to the northeast of the host vehicle, which may include locations for the remote vehicle RV from zero degrees (0°, 360°, 2π, or north) to ninety degrees (90°, π/2, or east), a second orientation sector $Q_2$ to the southeast of the host vehicle, which may include locations from ninety degrees (90° or π/2) to 180 degrees (180°, π, or south), a third orientation sector $Q_3$ to the southwest of the host vehicle, which may include locations from 180 degrees (180° or π) to 270 degrees (270°, 3π/2, or west), and a fourth orientation sector $Q_4$ to the northwest of the host vehicle, which may include locations from 270 degrees (270°, 3π/2, or west) to 360 degrees (0°, 360°, 2π, or north).

FIG. 3 demonstrates generating projected vehicle transportation network information within the first orientation sector $Q_1$ as an example. Generating projected vehicle transportation network information can include determining a geodesic between the host vehicle HV and the remote vehicle RV. A geodesic is a geospatially direct line between the host vehicle HV and the remote vehicle RV. The geodesic may be the shortest direct navigable or unnavigable line between the host vehicle HV and the remote vehicle RV respective of the curvature of the earth. The geodesic is shown as a solid line intersecting with the host vehicle and the remote vehicle and is shown extending beyond the vehicle for clarity. However, the length of the geodesic generally corresponds with a geospatially direct line distance between the host vehicle HV and the remote vehicle RV. Related thereto, generating projected vehicle transportation network information may also include determining a convergence angle $\beta_1$ for the geodesic. The convergence angle $\beta_1$ here indicates an angle between the geodesic and the reference direction in the geospatial domain. The vehicles are shown heading north, which is the reference direction here; however, the geodesic and convergence angle $\beta_1$ may be identified independently of vehicle heading. Although described herein with a reference direction of north, in some embodiments, projected vehicle transportation network information may be generated using the direction of the geodesic as the reference direction and the convergence angle $\beta_1$ may be zero degrees.

The geodesic may be determined based on host vehicle information, such as a geospatial location of the host vehicle, remote vehicle information, such as a geospatial location of the remote vehicle, or a combination thereof. For example, the host vehicle information may indicate a longitude ($\theta_{HV}$) for the host vehicle, a latitude ($\phi_{HV}$) for the host vehicle, or both, the remote vehicle information may indicate a longitude ($\theta_{RV}$) for the remote vehicle, a latitude ($\phi_{RV}$) for the remote vehicle, or both, σ may indicate a very small value used to avoid dividing by zero, and determining the convergence angle $\beta_1$ may be expressed as Equation (1) below:

$$\beta_1 = \pi\left[\frac{\theta_{HV} - \theta_{RV} - \sigma}{|\theta_{HV} - \theta_{RV}| + \sigma} + 1\right] - \cos^{-1}\left(\frac{(\phi_{RV} - \phi_{HV})}{\sqrt{(\theta_{RV} - \theta_{HV})^2 \cos^2\phi_{HV} + (\phi_{RV} - \phi_{HV})^2}}\right)\left[\frac{\theta_{HV} - \theta_{RV} - \sigma}{|\theta_{HV} - \theta_{RV}| + \sigma}\right].$$

A length of the geodesic, or instantaneous distance D between the host vehicle HV and the remote vehicle RV, may be determined based on the host vehicle information, the remote vehicle information, or a combination thereof. For example, f may indicate an earth flattening value, such as f=1/298.257223563, $r_e$ may indicate a measure of the earth's equatorial radius, such as $r_e$=6,378,137 meters, and determining the distance D may be expressed as Equation (2) below:

$$D = (1-f)r_e\sqrt{\frac{(\theta_{RV} - \theta_{HV})^2\cos^2\phi_{HV} + (\phi_{RV} - \phi_{HV})^2}{\sin^2\phi_{HV} + (1-f)^2\cos^2\phi_{HV}}}.$$

In the example of the first orientation sector $Q_1$ in FIG. 3, the remote vehicle, and the geodesic, is located to the northeast of the host vehicle in the geospatial domain. Regardless of the orientation sector Q, the host vehicle HV and remote vehicle RV may be oriented in any angle about their respective geospatial positions. Namely, the host vehicle may have a host vehicle heading angle $\delta_{HV}$ where $0 \leq \delta_{HV} < \pi/2$ (i.e., from 0 to 90 degrees from the reference direction). The host vehicle may have a host vehicle heading angle $\delta_{HV}$ where $\pi/2 \leq \delta_{HV} < \pi$ (i.e., from 90 to 180 degrees from the reference direction). The host vehicle may have a host vehicle heading angle $\delta_{HV}$ where $\pi \leq \delta_{HV} < 3\pi/2$ (i.e., from 180 to 270 degrees from the reference direction). Finally, the host vehicle may have a host vehicle heading angle $\delta_{HV}$ where $3\pi/2 \leq \delta_{HV} < 2\pi$ (i.e., from 270 to 360 degrees from the reference direction).

In a similar manner, the orientation of the remote vehicle RV may be defined. The remote vehicle may have a remote vehicle heading angle $\delta_{RV}$ where $0 \leq \delta_{RV} < \pi/2$ (i.e., from 0 to 90 degrees from the reference direction). The remote vehicle may have a remote vehicle heading angle $\delta_{RV}$ where $\pi/2 \leq \delta_{RV} < \pi$ (i.e., from 90 to 180 degrees from the reference direction). The remote vehicle may have a remote vehicle heading angle $\delta_{RV}$ where $\pi \leq \delta_{RV} < 3\pi/2$ (i.e., from 180 to 270 degrees from the reference direction). Finally, the remote vehicle may have a remote vehicle heading angle $\delta_{RV}$ where $3\pi/2 \leq \delta_{RV} < 2\pi$ (i.e., from 270 to 360 degrees from the reference direction).

A radius of curvature of the curved path P and an angle extending along the curved path between the host vehicle HV and the remote vehicle HV (also called a facing angle herein) can be used to determine an expected host vehicle route for the host vehicle. Determining an expected host vehicle route can include determining the path length of the curved path P. The path length is the distance between the host vehicle HV and the remote vehicle RV along the curved path P.

The calculation, however, is complicated because vehicle locations and heading angles do not indicate the direction of the curve forming the curved path. That is, the calculation of path length requires knowing the direction of the curve, and hence knowing which vehicle is following which, but a remote vehicle message that includes remote vehicle geospatial state information for the remote vehicle and remote vehicle kinematic state information for the remote vehicle including at least a remote heading angle for the remote vehicle does not provide this information, even in conjunction with similar information identified for the host vehicle. This deficiency is addressed herein by assuming that the host vehicle HV is following the remote vehicle RV along a curved path P of constant radius R in known directions. From the developed geometric relationships, generating the projected vehicle transportation network information can be achieved by generating a common predictor for the path length whether the curved path is curving left or curving right.

The development of the geometric relationships starts with the four different ranges of values for each of the host vehicle heading angle $\delta_{HV}$ and the remote vehicle heading angle $\delta_{RV}$ associated with every measured position of the vehicle as described above with reference to FIG. 3. The direction of the curved path and the values of these angles, given that it is known that the host vehicle HV is following the remote vehicle RV, dictate in which orientation sector Q the geodesic is located. Because there are four possible heading angles for each vehicle, there are sixteen possible heading angle combinations for the host vehicle HV and the remote vehicle RV in a left-hand curve (i.e., when the curved path is curving left) and sixteen possible heading angle combinations for the host vehicle HV and the remote vehicle RV in a right-hand curve (i.e., when the curved path is curving right).

Figure 4A:
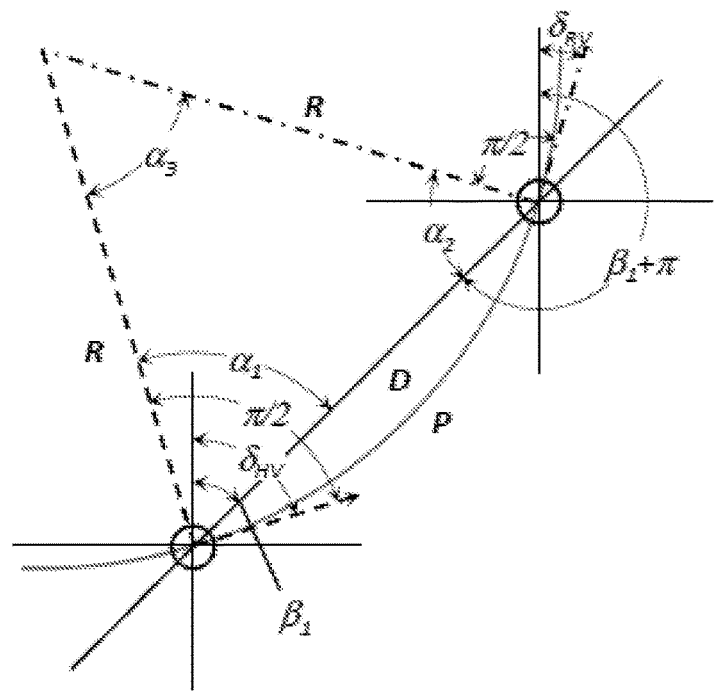
FIGS. 4A to 4P are diagrams illustrating the sixteen possible heading angle combinations for a left-hand curve in a curved path where a host vehicle is following a remote vehicle.
Figure 4B:
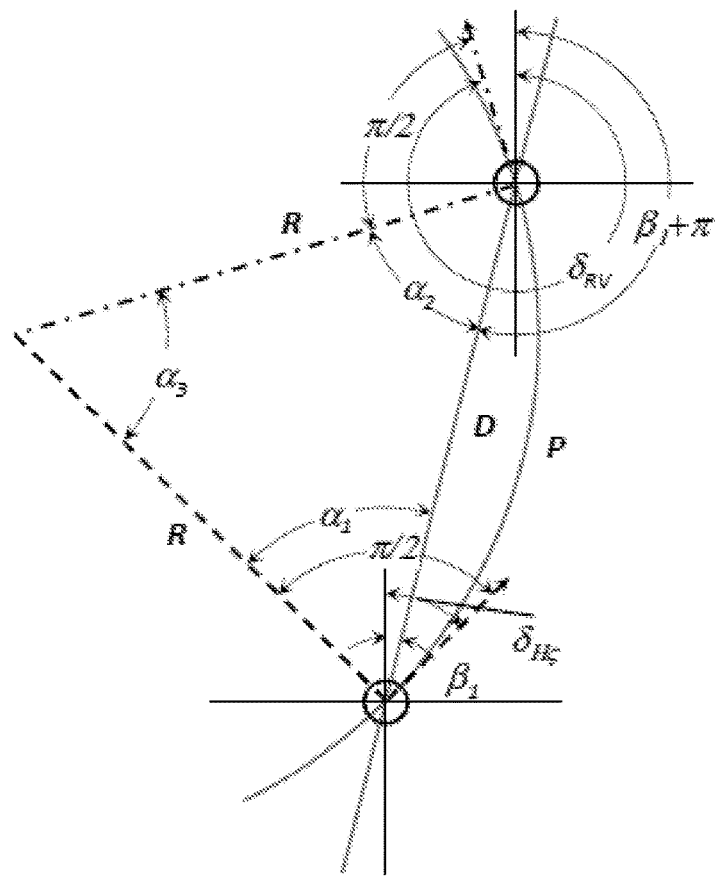
Figure 4C:
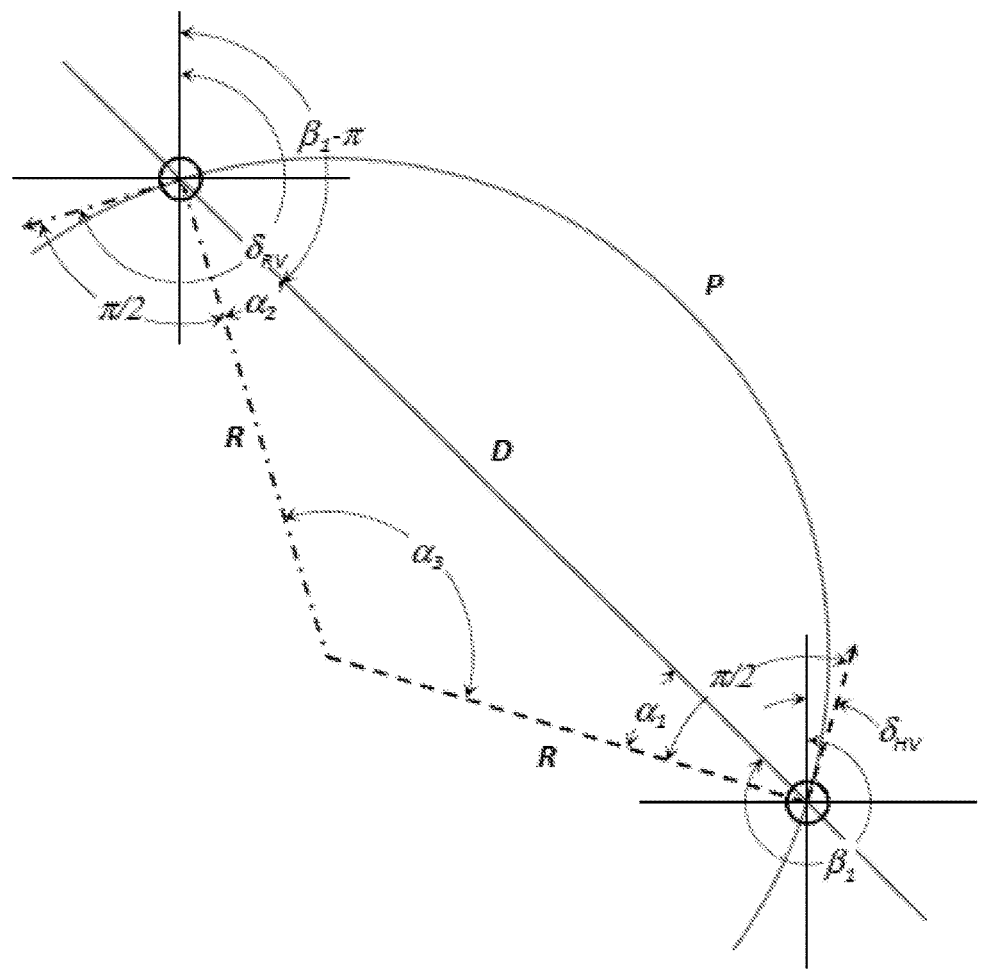
Figure 4D:
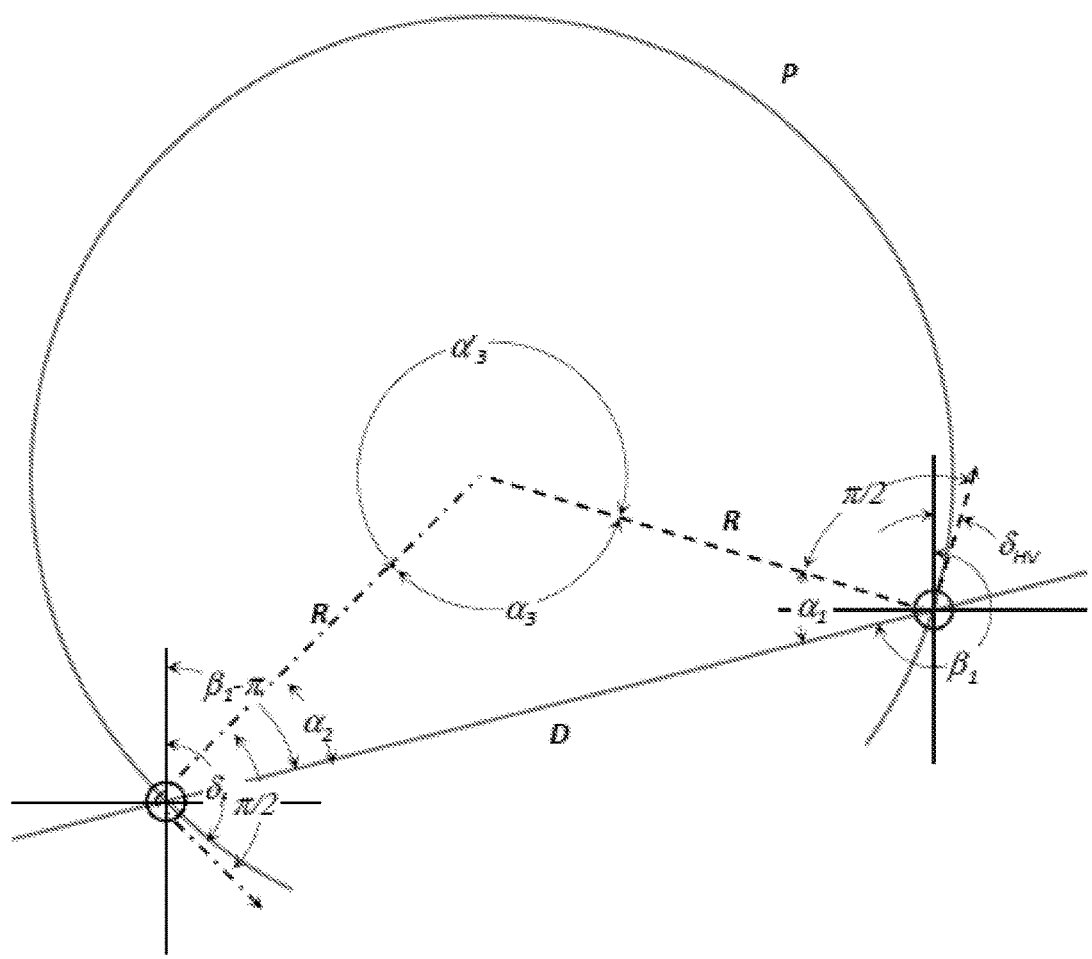
Figure 4E:
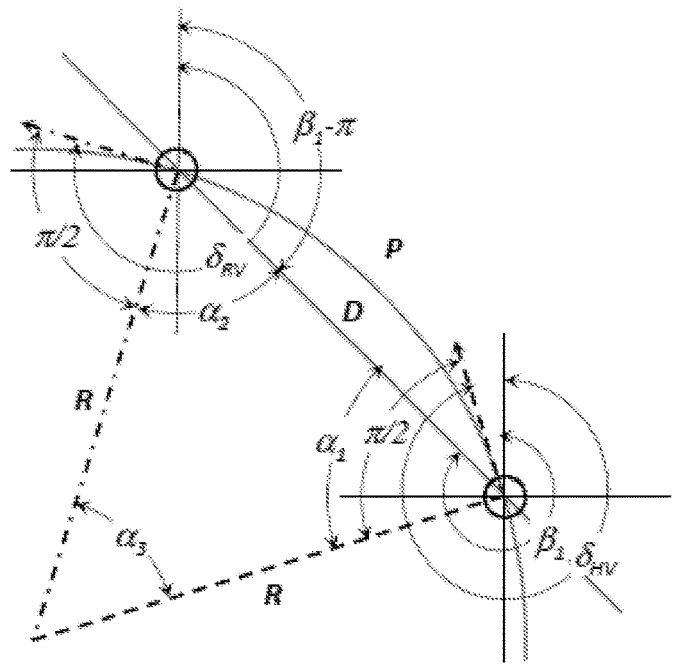
Figure 4F:
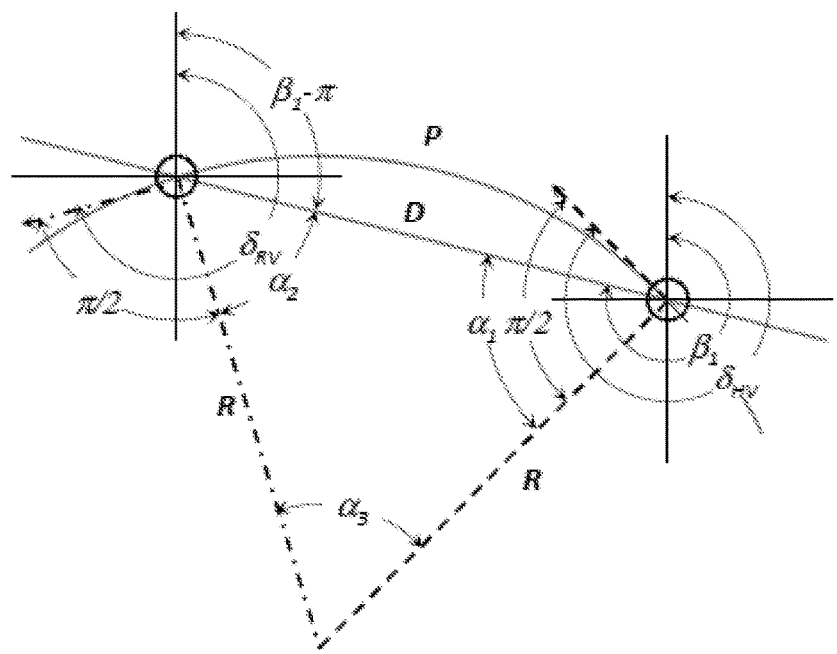
Figure 4G:
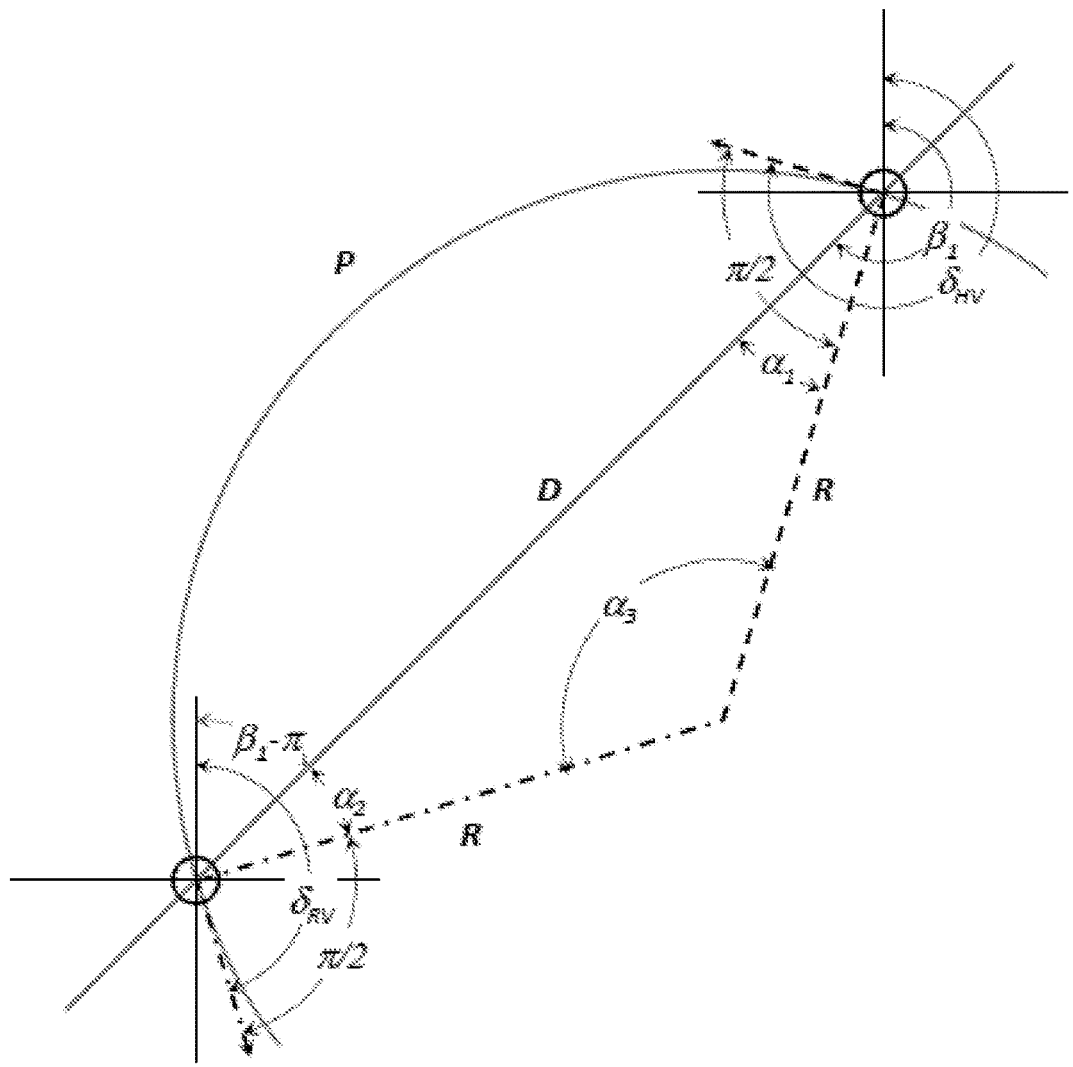
Figure 4H:
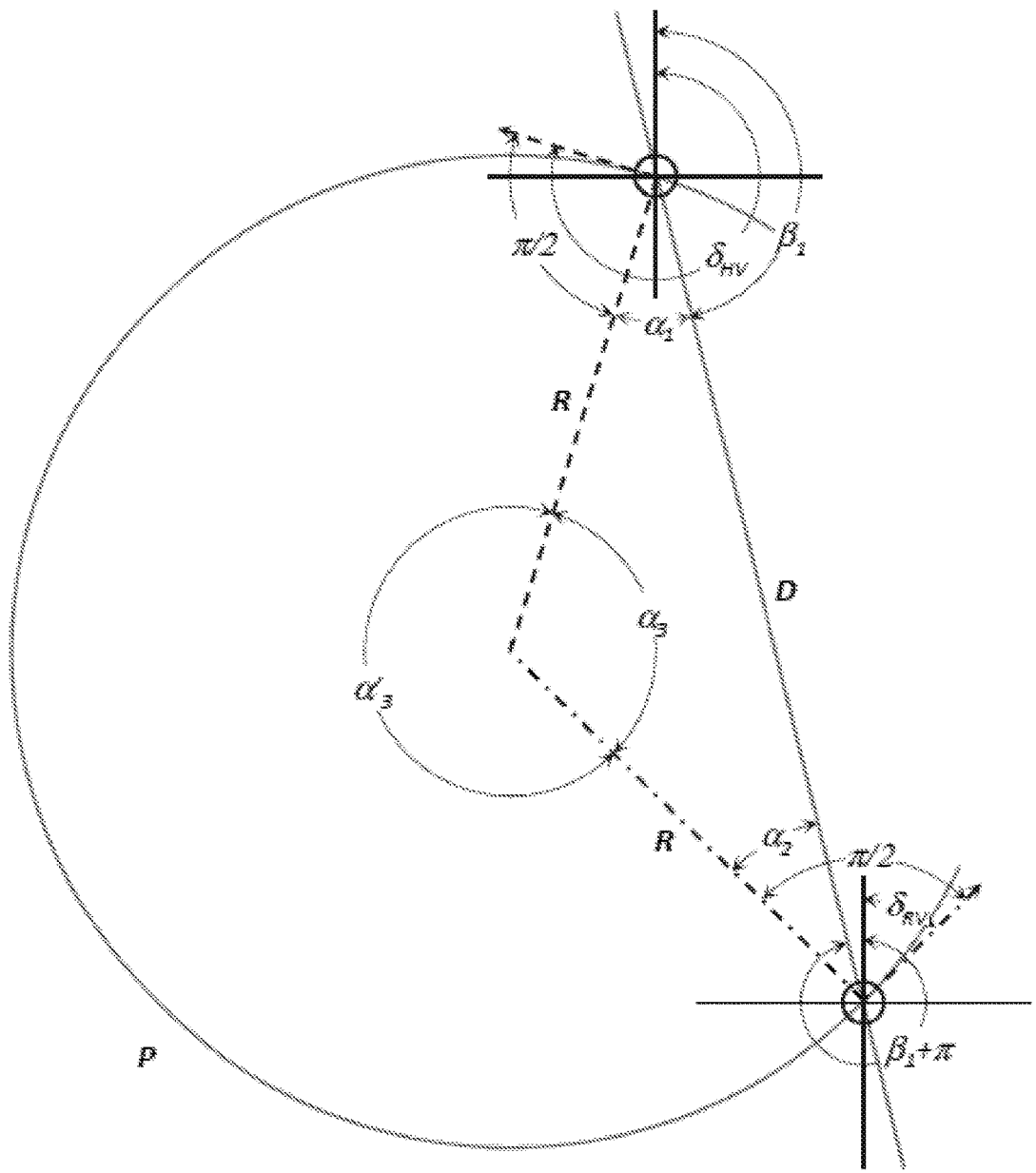
Figure 4I:
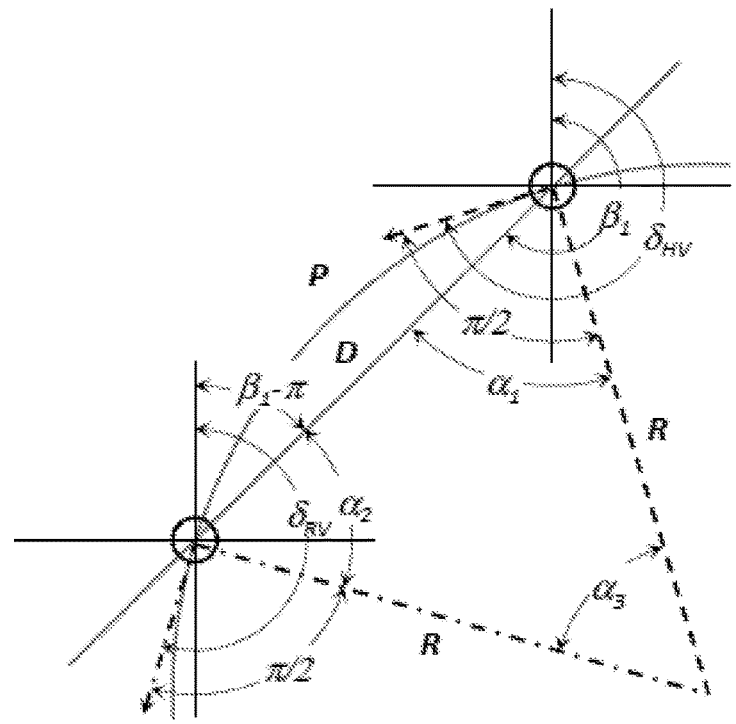
Figure 4J:
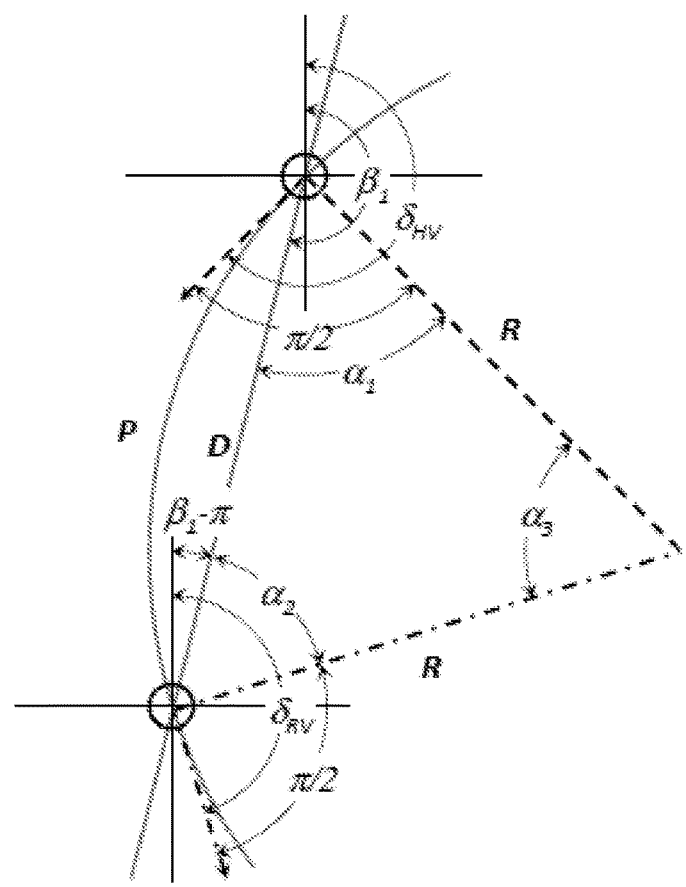
Figure 4K:
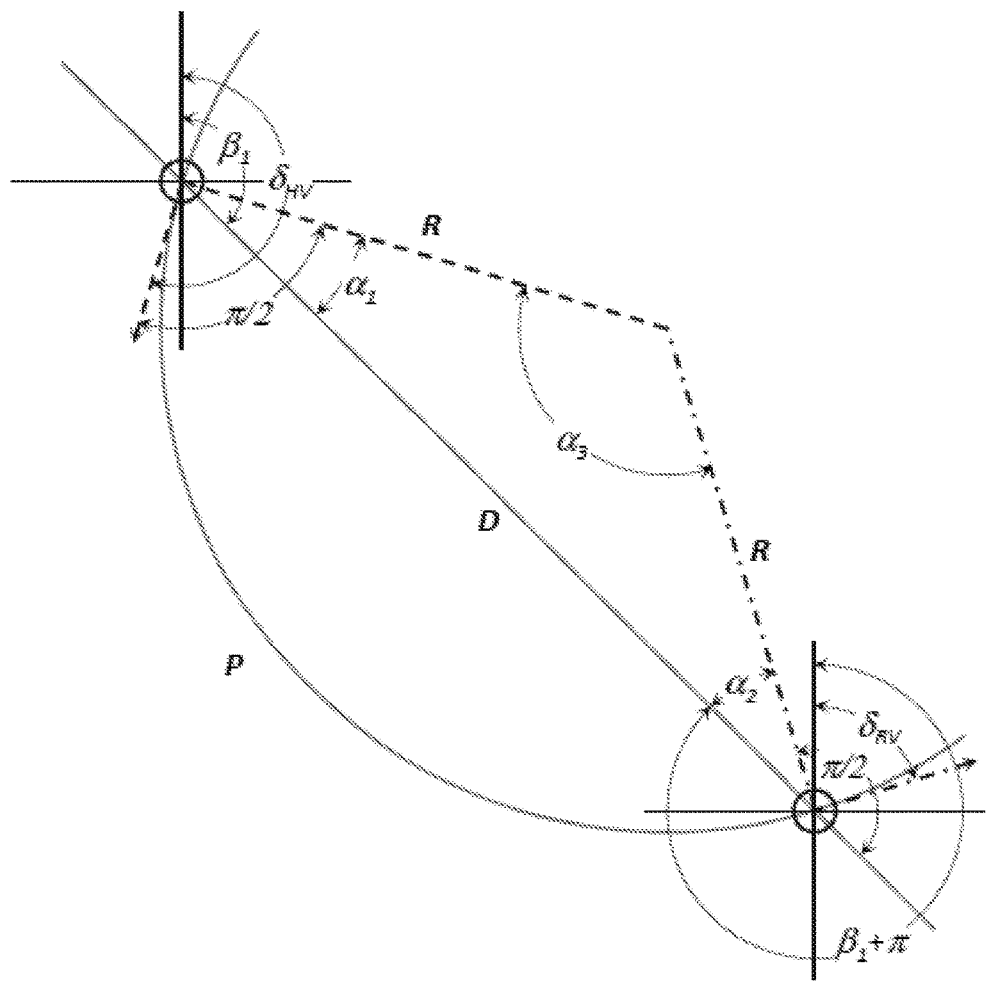
Figure 4L:
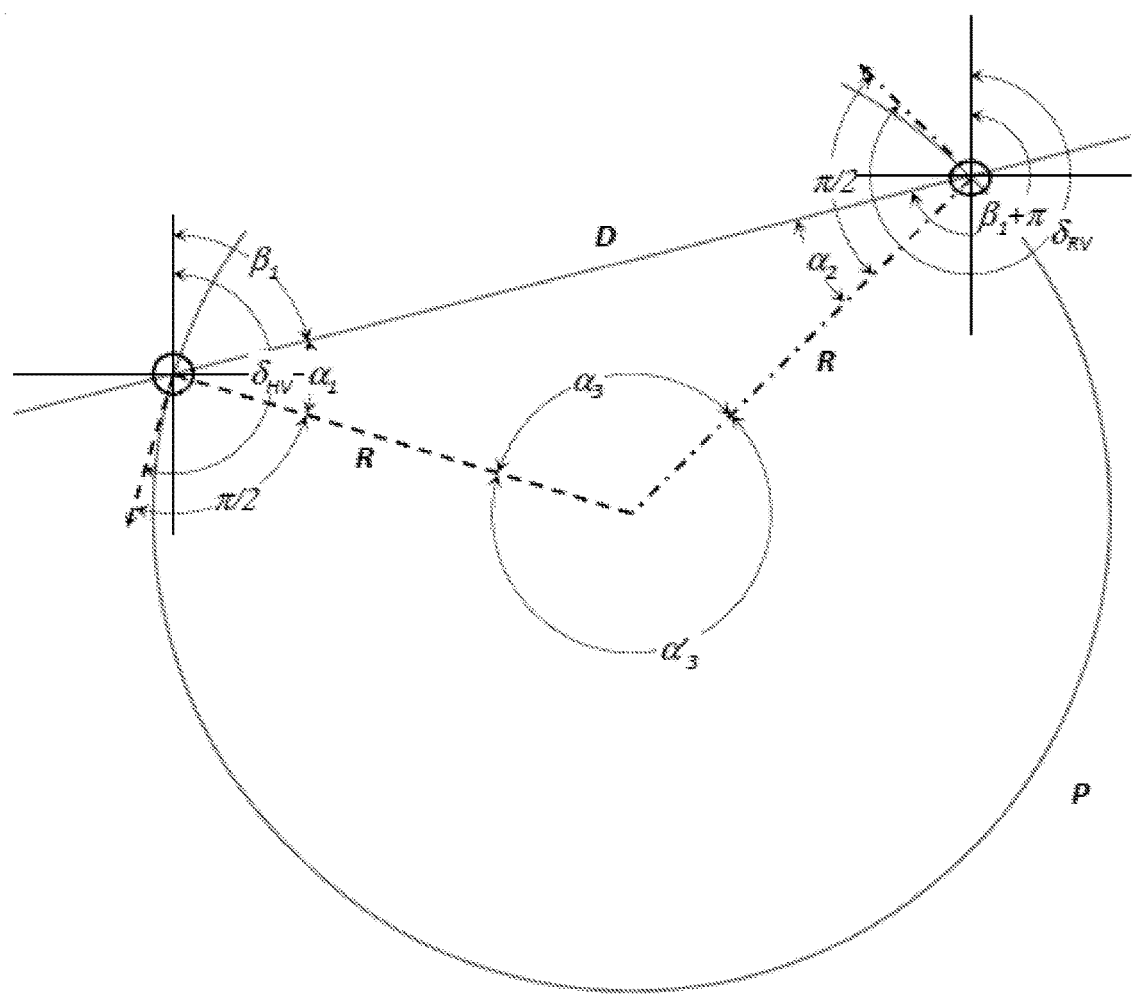
Figure 4M:
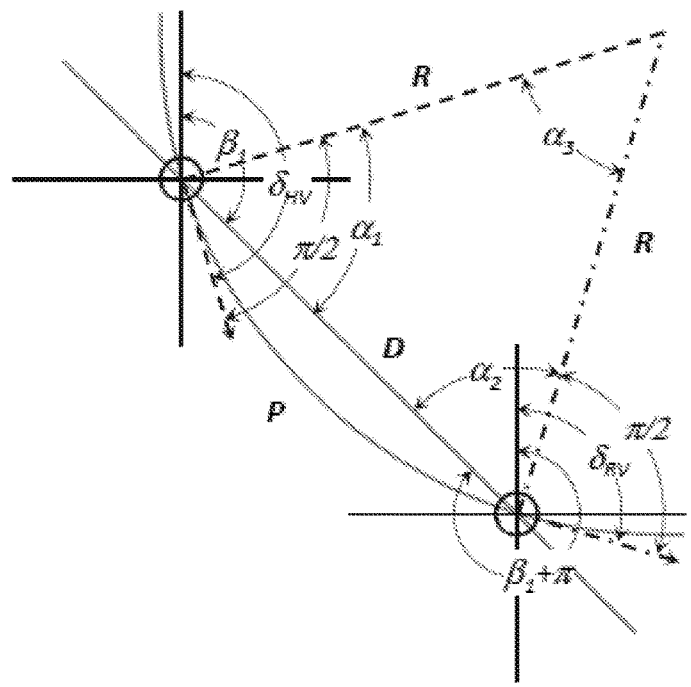
Figure 4N:
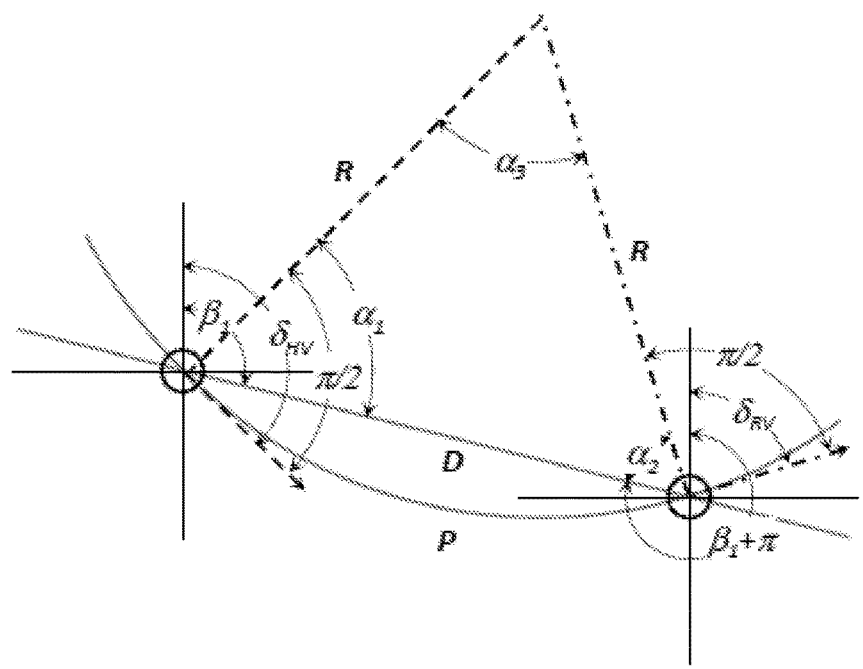
Figure 4O:
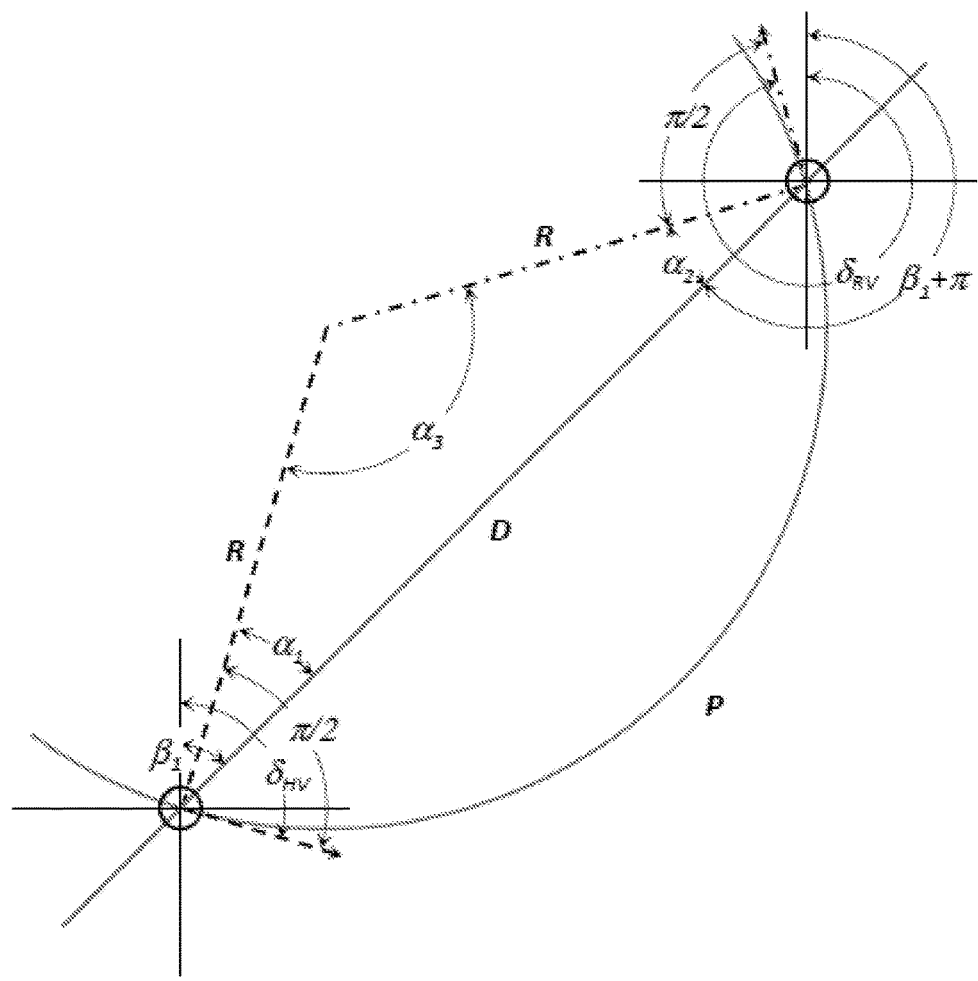
Figure 4P:
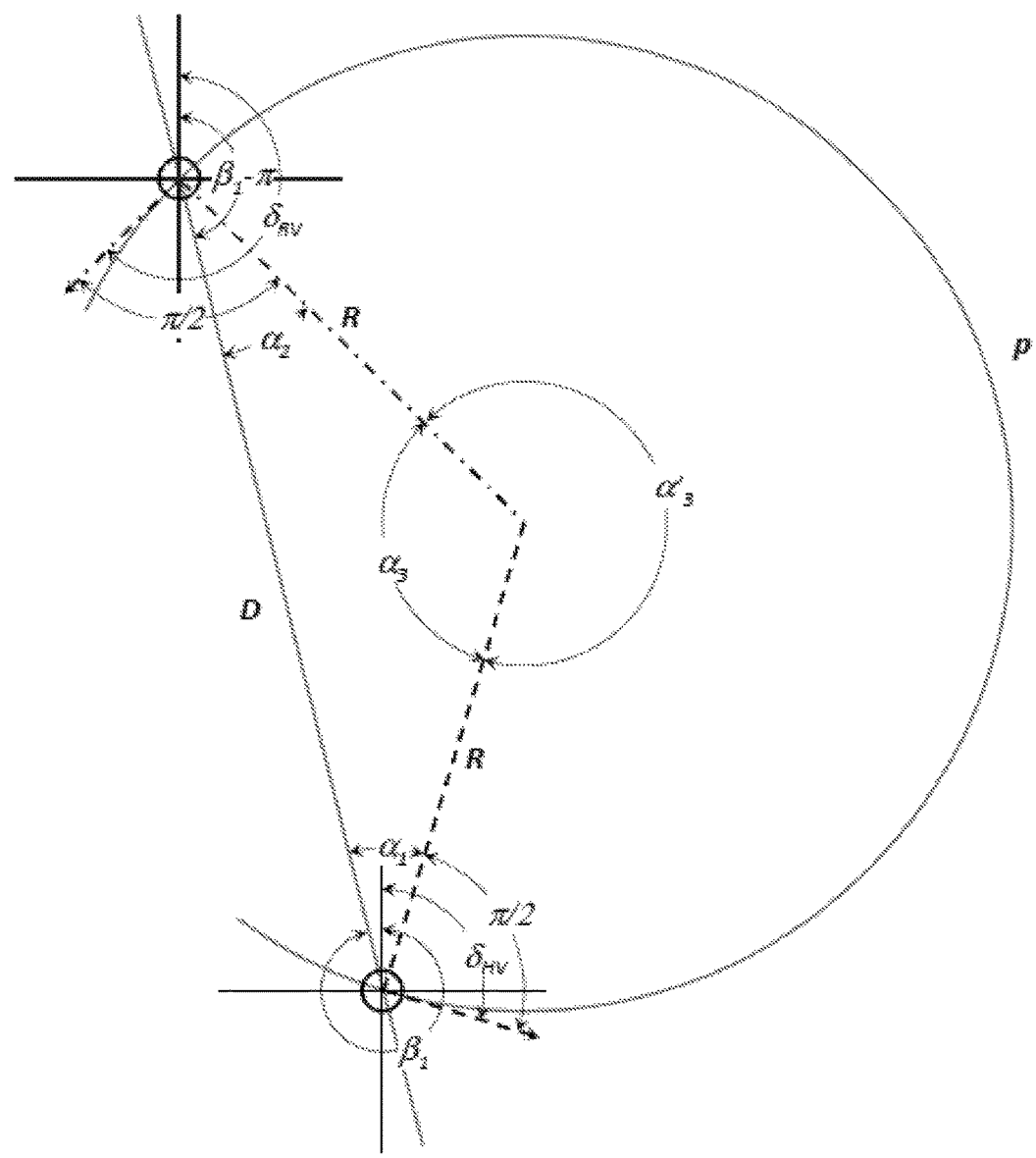
Figure 5A:
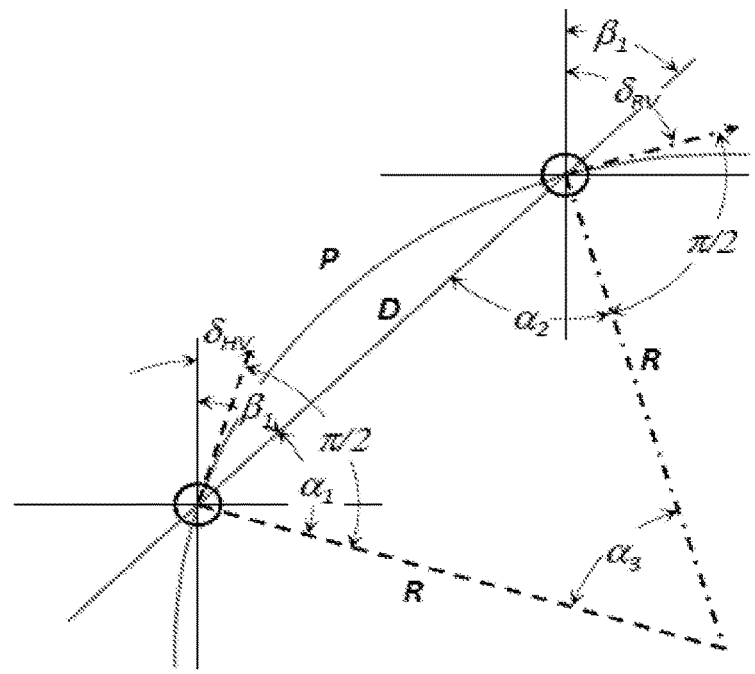
FIGS. 5A to 5P are diagrams illustrating the sixteen possible heading angle combinations for a right-hand curve in a curved path where a host vehicle is following a remote vehicle.
Figure 5B:
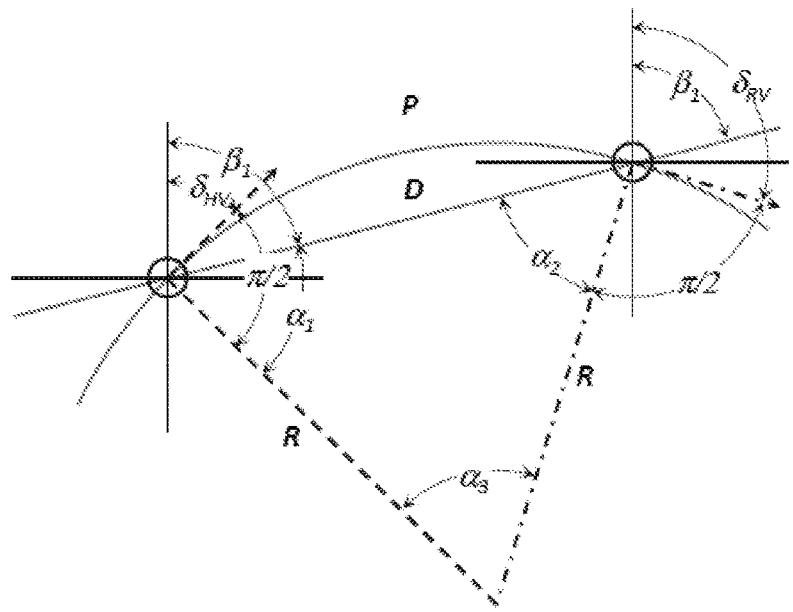
Figure 5C:
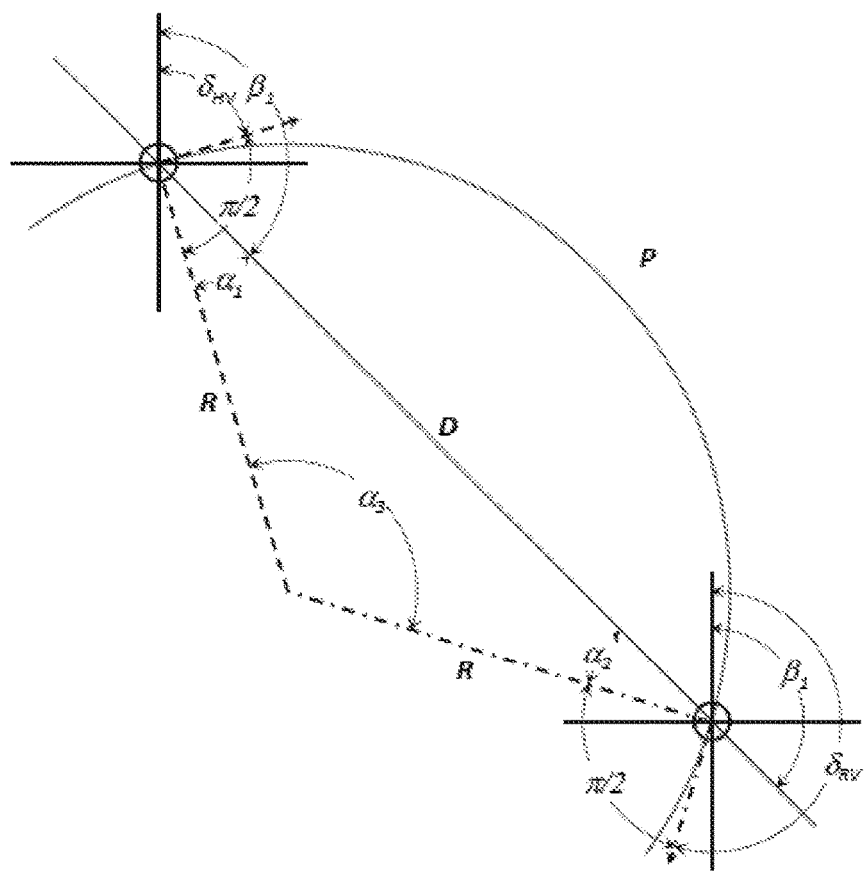
Figure 5D:
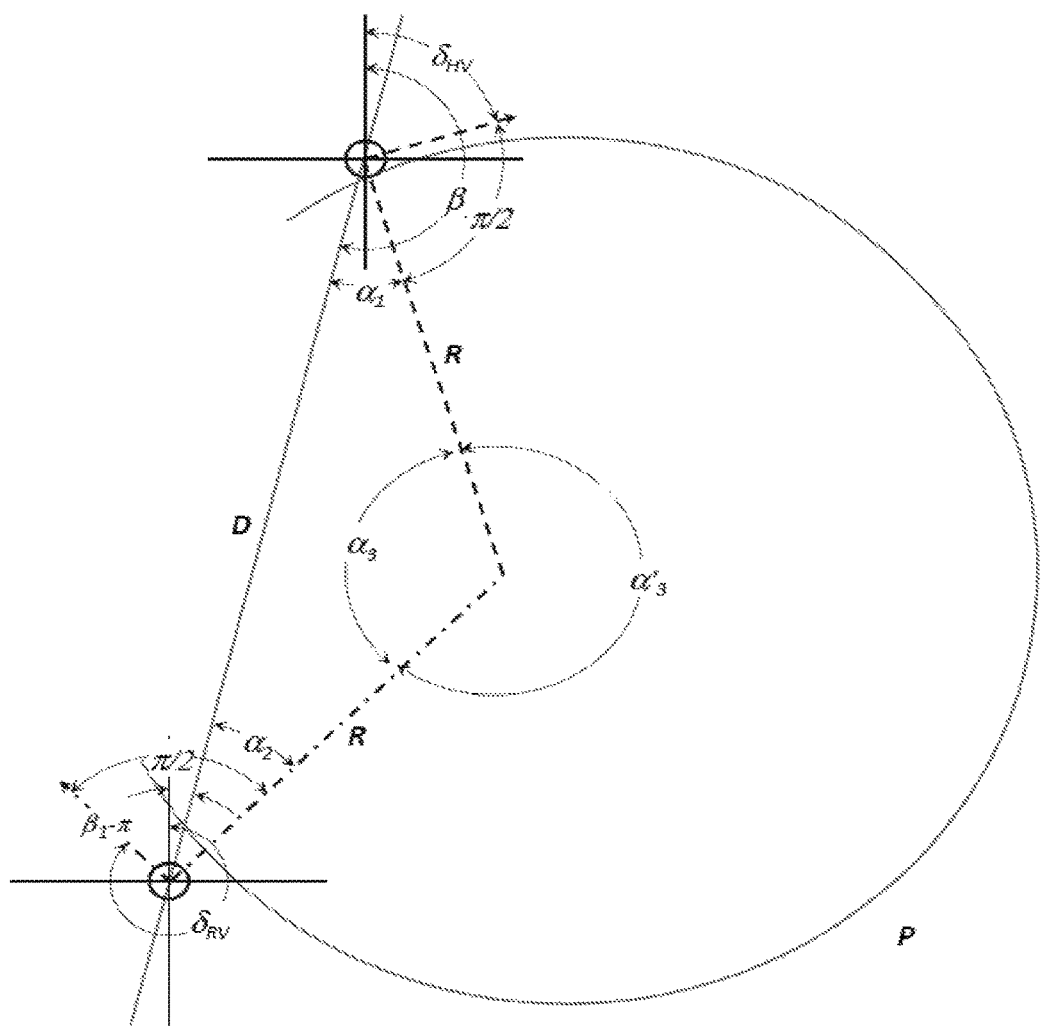
Figure 5E:
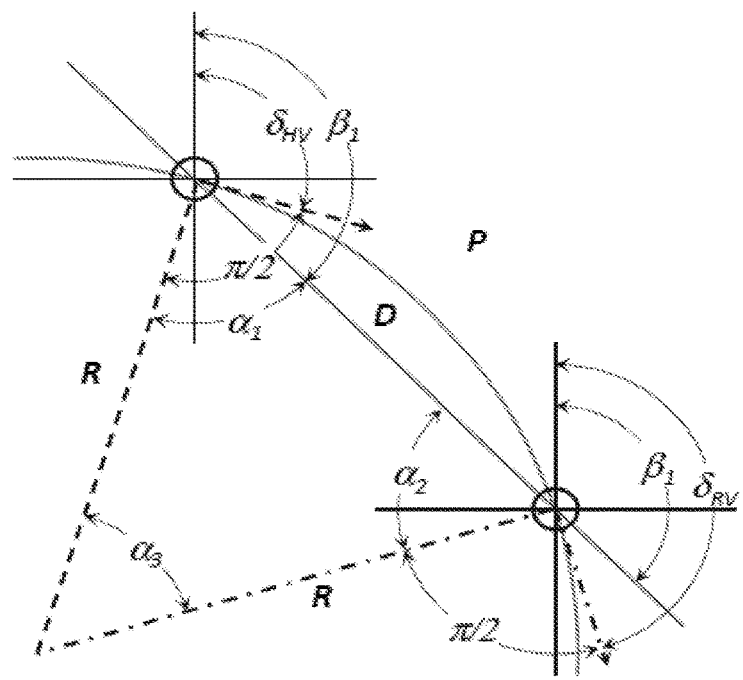
Figure 5F:
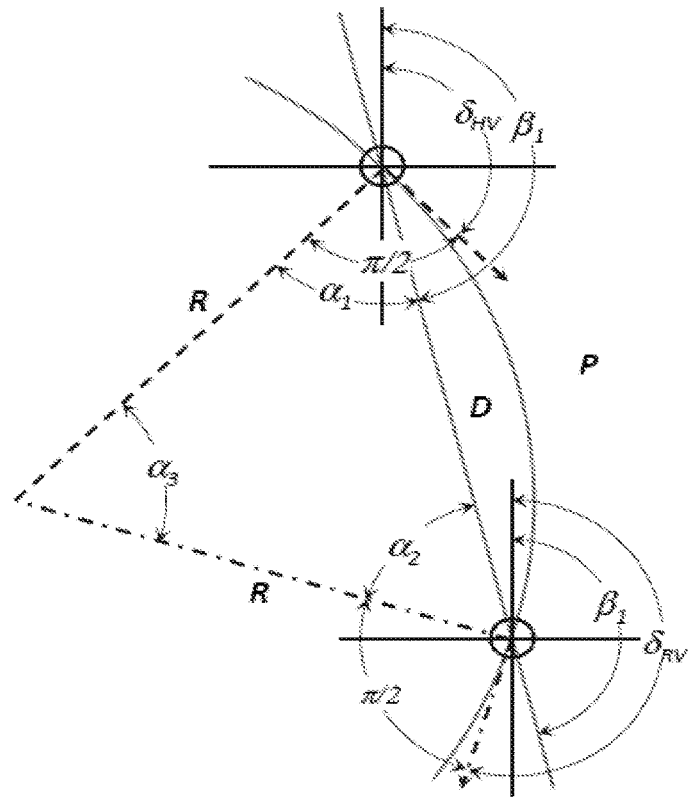
Figure 5G:
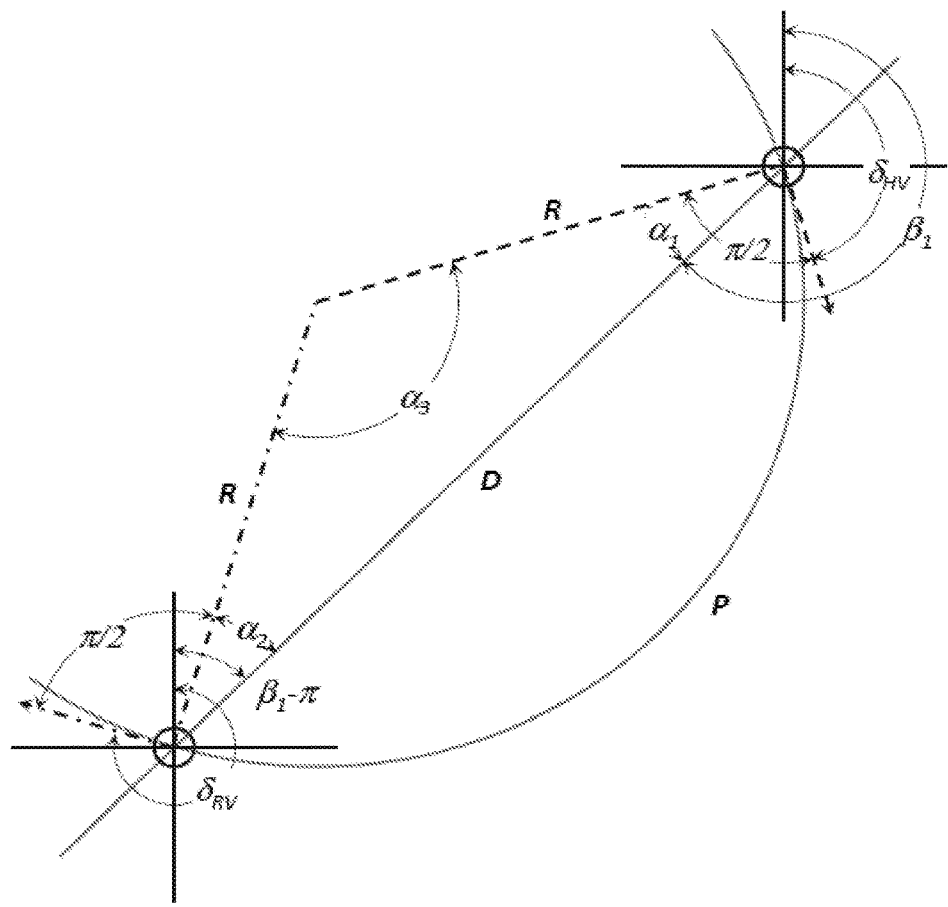
Figure 5H:
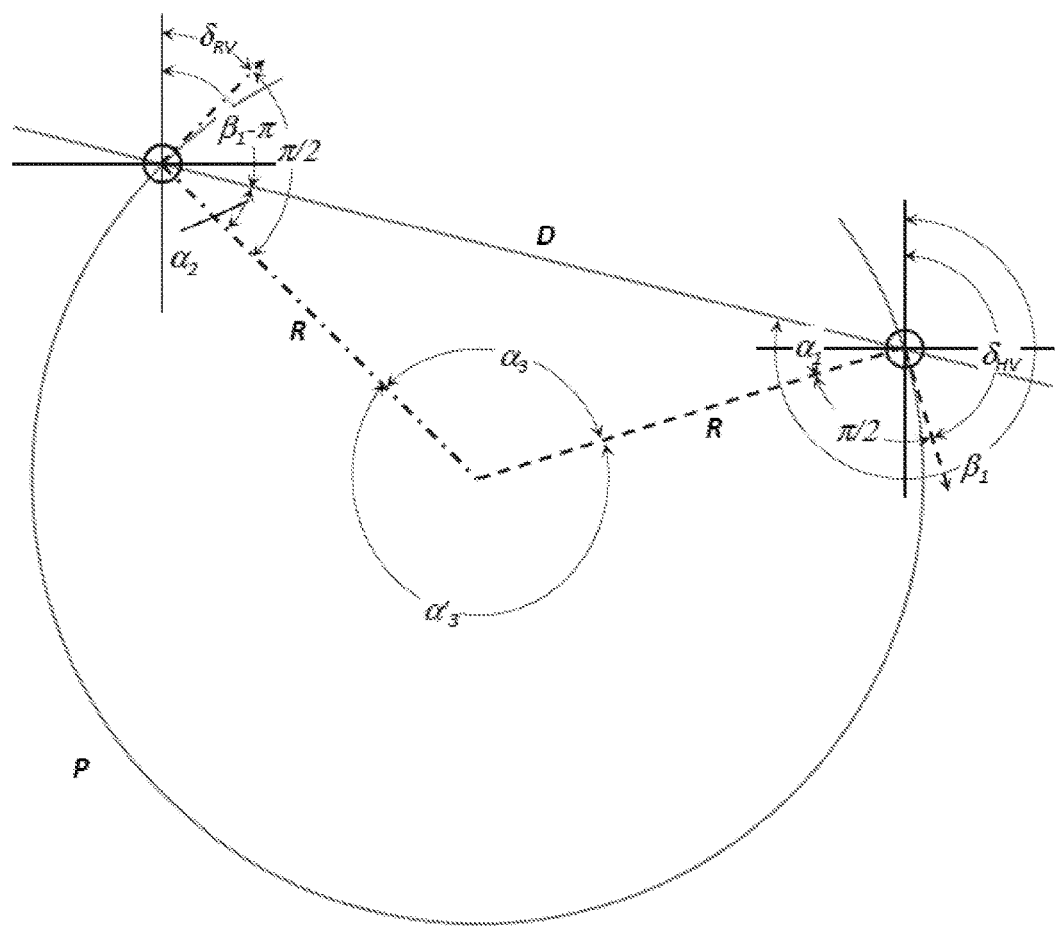
Figure 5I:
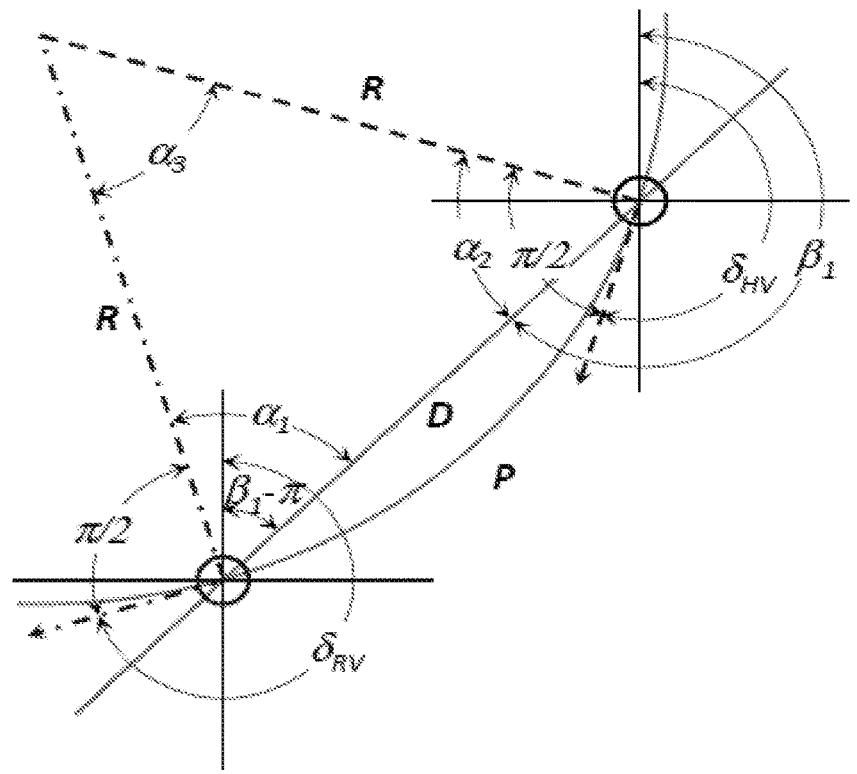
Figure 5J:
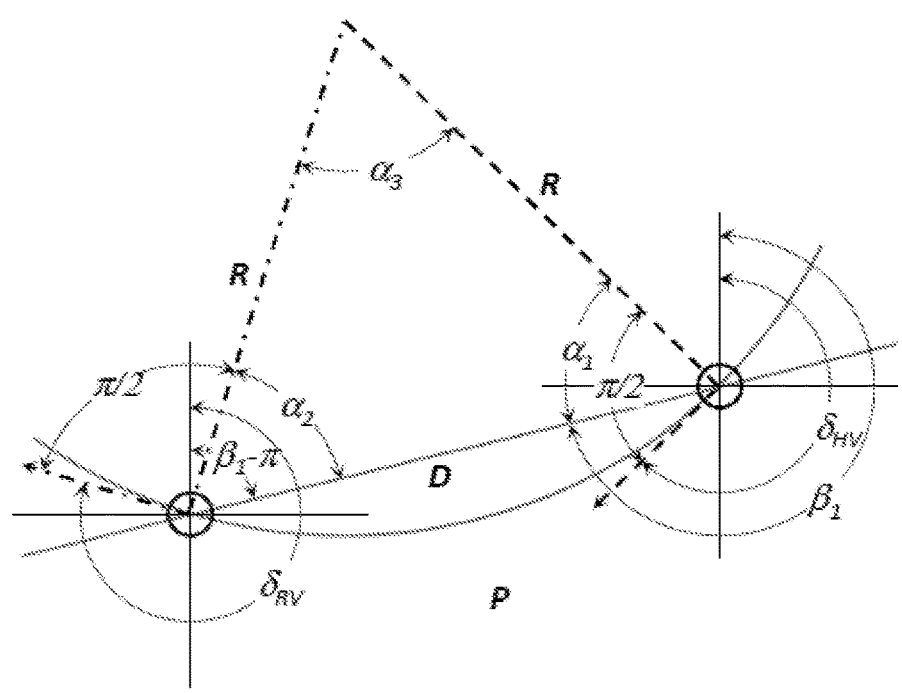
Figure 5K:
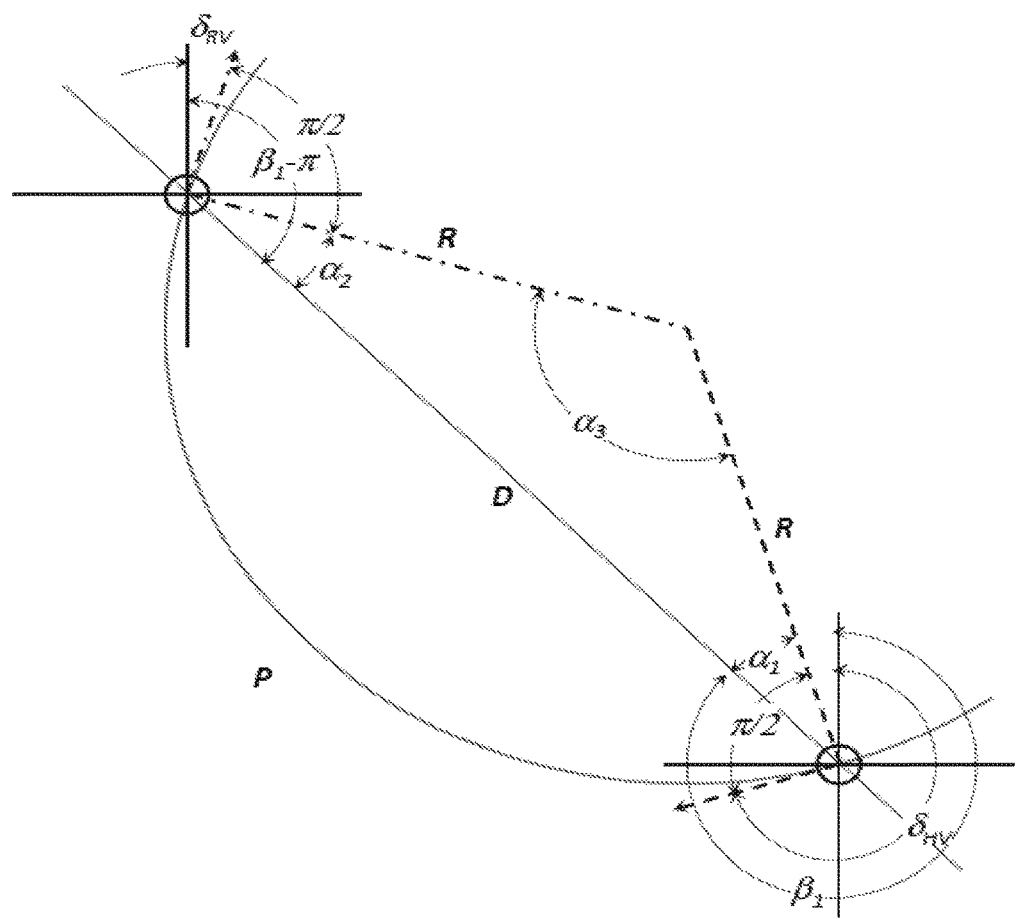
Figure 5L:
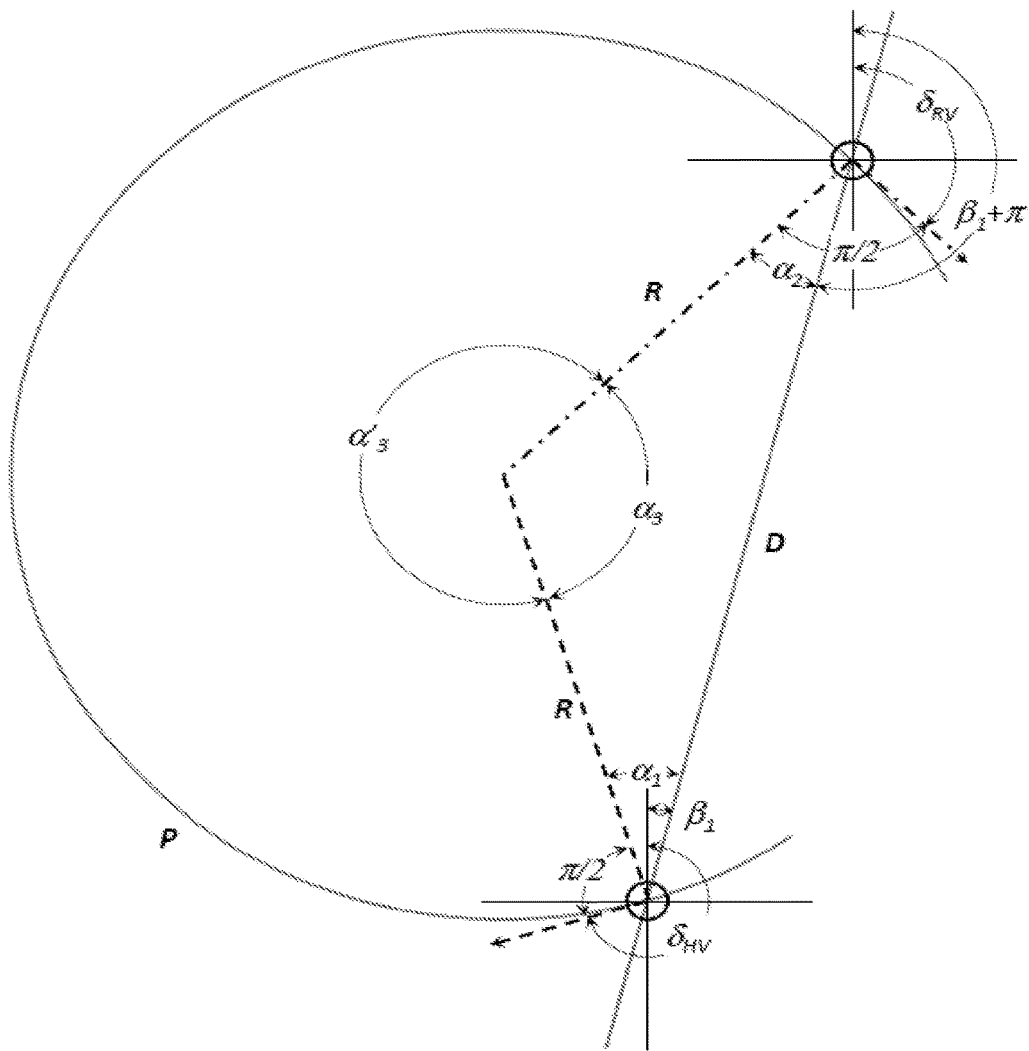
Figure 5M:
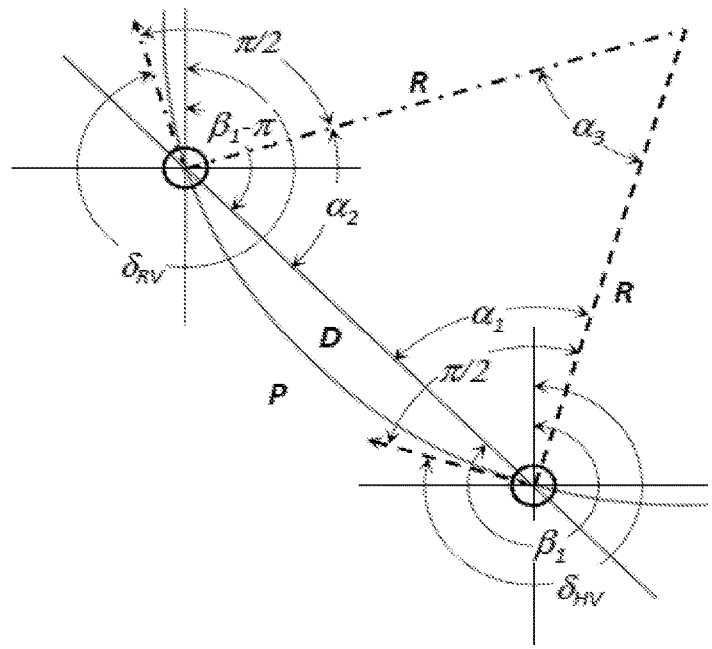
Figure 5N:
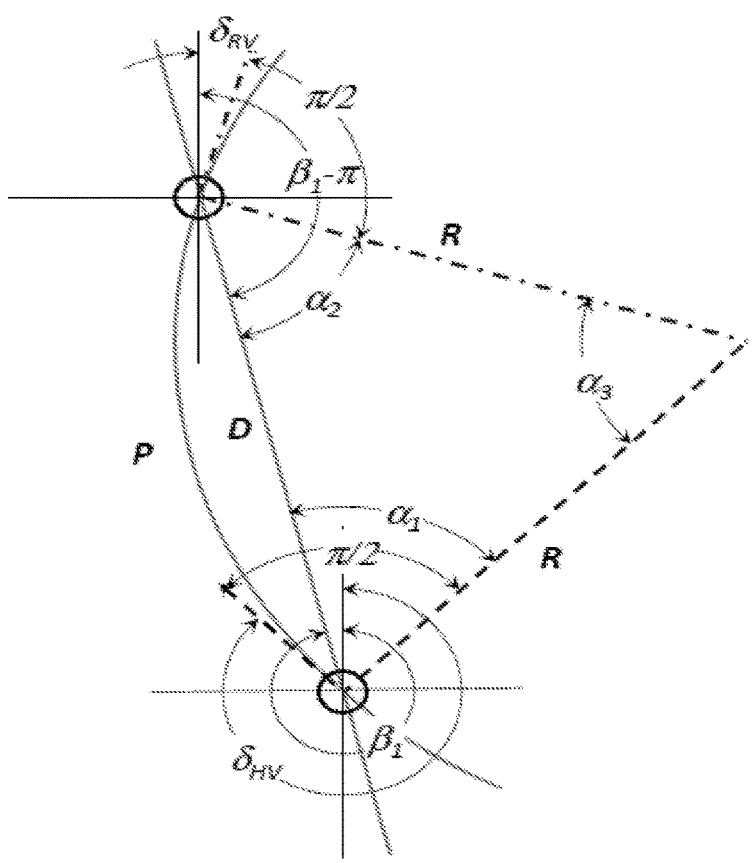
Figure 5O:
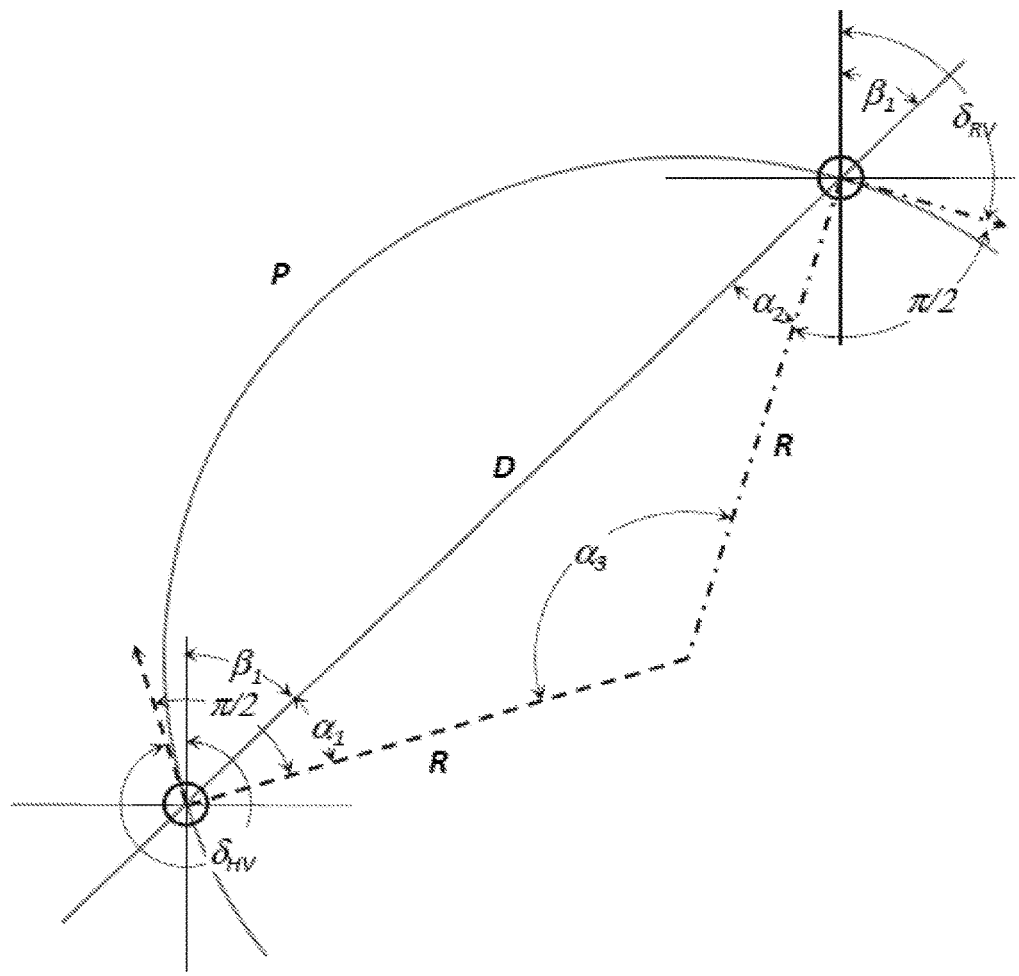
Figure 5P:
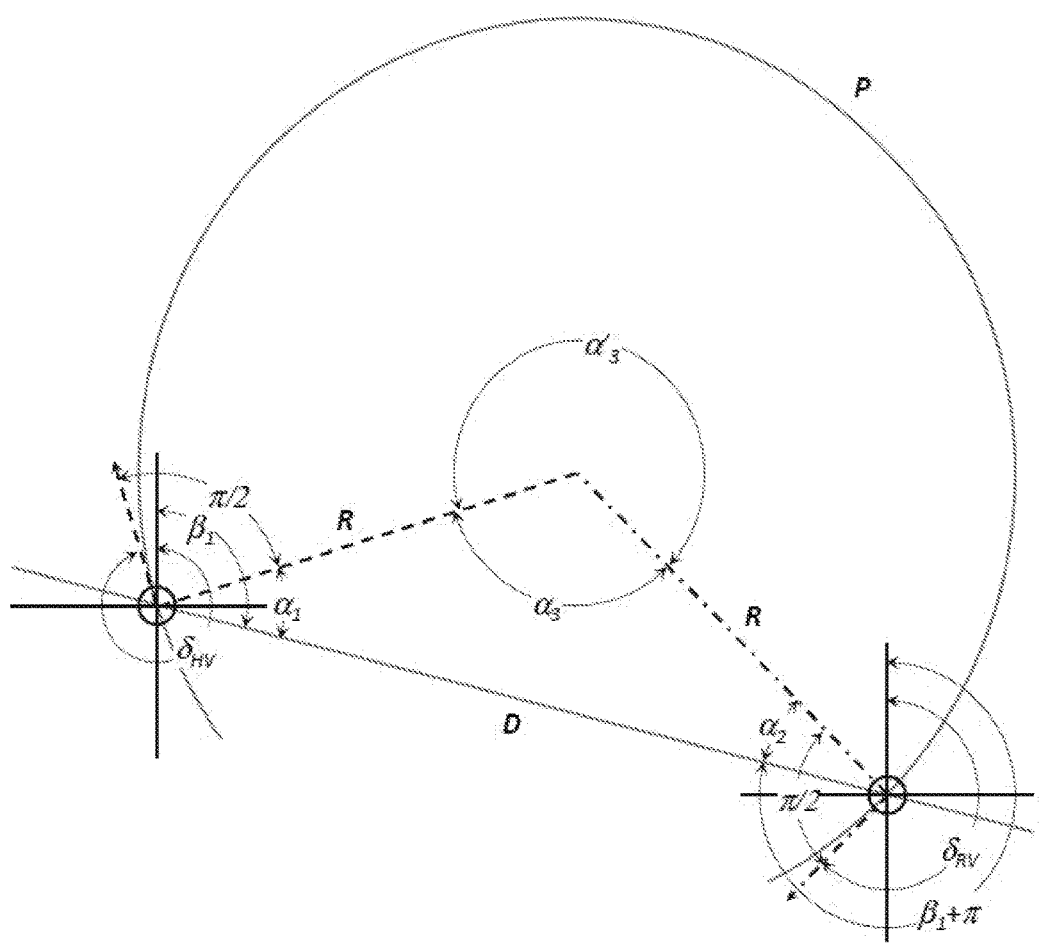

FIGS. 4A to 4P illustrate the sixteen possible heading angle combinations for a left-hand curve, while FIGS. 5A to 5P illustrate the sixteen possible heading angle combinations for a right-hand curve. These figures are used to explain how to calculate path length for the different possible heading angle combinations.

Referring first to FIGS. 4A to 4D, each shows the orientation of the remote vehicle RV with different ranges for the remote vehicle heading angle $\delta_{RV}$ where the host vehicle heading angle $\delta_{HV}$ is within the range defined by $0 \leq \delta_{HV} < \pi/2$. In FIG. 4A, the remote vehicle heading angle $\delta_{RV}$ is, like the host vehicle heading angle $\delta_{HV}$, within the range defined by $0 \leq \delta_{HV} < \pi/2$. In FIG. 4B, the remote vehicle heading angle $\delta_{RV}$ is within the range defined by $3\pi/2 \leq \delta_{RV} < 2\pi$. In FIG. 4C, the remote vehicle heading angle $\delta_{RV}$ is within the range defined by $\pi \leq \delta_{RV} < 3\pi/2$. In FIG. 4D, the remote vehicle heading angle $\delta_{RV}$ is within the range defined by $\pi/2 \leq \delta_{RV} < \pi$. Each is oriented as shown in the example of FIG. 3, that is, with the reference direction relative to the host vehicle being north. Again, this is not required; only a consistency in the reference direction once defined is required. The geodesic D between the host vehicle HV and the remote vehicle RV is also shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. In FIGS. 4A to 4D, these lines are both labeled R as they each correspond to the radius of curvature of the curved path P. In other words, the lengths of lines R should be the same if the curved path has a constant radius R. Herein, if referred to separately, line R extending from the host vehicle HV to the intersection point is called line $R_{HV}$, while the line R extending from the remote vehicle RV to the intersection point is called line $R_{RV}$.

Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha_3$ can be calculated as $\alpha_3 = \pi - (\alpha_1 + \alpha_2)$. Determining the acute angle $\alpha_1$ between the geodesic D and line $R_{HV}$ and the acute angle $\alpha_2$ between the geodesic D and line $R_{RV}$ can be achieved using geometric equations. Acute angle $\alpha_1$ between the geodesic D and line $R_{HV}$ may also be referred to herein as a host angle as it is generated from intersecting line segments at the host vehicle. Acute angle $\alpha_2$ between the geodesic D and line $R_{RV}$ may also be referred to herein as a remote angle as it is generated from intersecting line segments at the remote vehicle.

In FIG. 4A, the following equations apply to the angular relationships at the host vehicle HV and the remote vehicle RV, respectively:

$$\pi/2 - \delta_{HV} = \alpha_1 - \beta_1; \text{ and}$$

$$\beta_1 + \pi + \alpha_2 + \pi/2 - \delta_{RV} = 2\pi.$$

Solving for acute angle $\alpha_1$ results in:

$$\alpha_1 = \pi/2 - \delta_{HV} + \beta_1$$

Solving for acute angle $\alpha_2$ results in:

$$\alpha_2 = \pi/2 + \delta_{RV} - \beta_1.$$

In FIG. 4B, the same equation and solution as in FIG. 4A apply for acute angle $\alpha_1$ so they are not repeated here. However, the angular relationships at the remote vehicle RV result in the following equation:

$$\beta_1 + \pi + \alpha_2 + \pi/2 = \delta_{RV}.$$

Solving for acute angle $\alpha_2$ results in:

$$\alpha_2 = -(3\pi/2 - \delta_{RV} + \beta_1).$$

In FIG. 4C, the following equations apply to the angular relationships at the host vehicle HV and the remote vehicle RV, respectively:

$$\beta_1 - \alpha_1 + \pi/2 - \delta_{HV} = 2\pi; \text{ and}$$

$$\beta_1 - \pi + \alpha_2 + \pi/2 = \delta_{RV}.$$

Solving for acute angle $\alpha_1$ results in:

$$\alpha_1 = -(3\pi/2 + \delta_{HV} - \beta_1).$$

Solving for acute angle $\alpha 2$ results in:

$$\alpha_2 = \pi/2 + \delta_{RV} - \beta_1.$$

In FIG. 4D, the following equations apply to the angular relationships at the host vehicle HV and the remote vehicle RV, respectively:

$$\beta_1 + \alpha_1 + \pi/2 - \delta_{HV} = 2\pi; \text{ and}$$

$$\beta_1 - \pi - \alpha_2 = \delta_{RV} + \pi/2.$$

Solving for acute angle $\alpha_1$ results in:

$$\alpha_1 = 3\pi/2 + \delta_{HV} - \beta_1.$$

Solving for acute angle $\alpha_2$ results in:

$$\alpha_2 = -(\pi/2 + \delta_{RV} - \beta_1).$$

Referring next to FIGS. 4E to 4H, each shows the orientation of the remote vehicle RV with different ranges for the remote vehicle heading angle $\delta_{RV}$ where the host vehicle heading angle $\delta_{HV}$ is within the range defined by $3\pi/2 \le \delta_{HV} < 2\pi$. In FIG. 4E, the remote vehicle heading angle $\delta_{RV}$ is, like the host vehicle heading angle $\delta_{HV}$, within the range defined by $3\pi/2 \le \delta_{RV} < 2\pi$. In FIG. 4F, the remote vehicle heading angle $\delta_{RV}$ is within the range defined by $\pi \le \delta_{RV} < 3\pi/2$. In FIG. 4G, the remote vehicle heading angle $\delta_{RV}$ is within the range defined by $\pi/2 \le \delta_{RV} < \pi$. In FIG. 4H, the remote vehicle heading angle $\delta_{RV}$ is within the range defined by $0 \le \delta_{HV} < \pi/2$. Each is oriented as shown in FIGS. 4A to 4D. The geodesic D between the host vehicle HV and the remote vehicle RV is shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. As in FIGS. 4A to 4D, these lines are both labeled R as they each correspond to the radius of curvature of the curved path P.

Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha_3$ can be calculated as $\alpha_3 = \pi - (\alpha_1 + \alpha_2)$. Determining the acute angle $\alpha_1$ between the geodesic D and line $R_{HV}$ and the acute angle $\alpha_2$ between the geodesic D and line $R_{RV}$ can be achieved using geometric equations.

In FIG. 4E, the following equations apply to the angular relationships at the host vehicle HV and the remote vehicle RV, respectively:

$$\delta_{HV} - \beta_1 = \alpha_1 - \pi/2; \text{ and}$$

$$\beta_1 - \pi + \alpha_2 + \pi/2 = \delta_{RV}.$$

Solving for acute angle $\alpha_1$ results in:

$$\alpha_1 = \pi/2 - \delta_{HV} + \beta_1.$$

Solving for acute angle $\alpha_2$ results in:

$$\alpha_2 = \pi/2 + \delta_{RV} - \beta_1.$$

In FIG. 4F, the same equations and solutions as in FIG. 4E apply for acute angles $\alpha_1$ and $\alpha_2$. Therefore, they are not repeated here.

In FIG. 4G, the same equations and solutions as in FIGS. 4E and 4F apply for acute angles $\alpha_1$ and $\alpha_2$. Therefore, they are not repeated here.

In FIG. 4H, the following equations apply to the angular relationships at the host vehicle HV and the remote vehicle RV, respectively:

$$\delta_{HV} = \beta_1 + \alpha_1 + \pi/2; \text{ and}$$

$$\beta_1 + \pi - \alpha_2 + \pi/2 - \delta_{RV} = 2\pi.$$

Solving for acute angle $\alpha_1$ results in:

$$\alpha_1 = -(\pi/2 - \delta_{HV} + \beta_1).$$

Solving for acute angle $\alpha_2$ results in:

$$\alpha_2 = -(\pi/2 + \delta_{RV} - \beta_1).$$

Referring next to FIGS. 4I to 4L, each shows the orientation of the remote vehicle RV with different ranges for the remote vehicle heading angle $\delta_{RV}$ where the host vehicle heading angle $\delta_{HV}$ is within the range defined by $\pi \le \delta_{RV} < 3\pi/2$. In FIG. 4I, the remote vehicle heading angle $\delta_{RV}$ is, like the host vehicle heading angle $\delta_{HV}$, within the range defined by $\pi \le \delta_{RV} < 3\pi/2$. In FIG. 4J, the remote vehicle heading angle $\delta_{RV}$ is within the range defined by $\pi/2 \le \delta_{RV} < \pi$. In FIG. 4K, the remote vehicle heading angle $\delta_{RV}$ is within the range defined by $0 \le \delta_{HV} < \pi/2$. In FIG. 4L, the remote vehicle heading angle $\delta_{RV}$ is within the range defined by $3\pi/2 \le \delta_{RV} < 2\pi$. Each is oriented as shown in FIGS. 4A to 4H. The geodesic D between the host vehicle HV and the remote vehicle RV is shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. As in FIGS. 4A to 4D, these lines are both labeled R as they each correspond to the radius of curvature of the curved path P.

Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha_3$ can be calculated as $\alpha_3 = \pi - (\alpha_1 + \alpha_2)$. Determining the acute angle $\alpha_1$ between the geodesic D and line $R_{HV}$ and the acute angle $\alpha_2$ between the geodesic D and line $R_{RV}$ can be achieved using geometric equations.

In FIG. 4I, the following equations apply to the angular relationships at the host vehicle HV and the remote vehicle RV, respectively:

$$\delta_{HV} - \beta_1 = \pi/2 - \alpha_1; \text{ and}$$

$$\beta_1 - \pi + \alpha_2 + \pi/2 = \delta_{RV}.$$

Solving for acute angle $\alpha_1$ results in:

$$\alpha_1 = \pi/2 - \delta_{HV} + \beta_1.$$

Solving for acute angle $\alpha_2$ results in:

$$\alpha_2 = \pi/2 + \delta_{RV} - \beta_1.$$

In FIG. 4J, the same equations and solutions as in FIG. 4I apply for acute angles $\alpha_1$ and $\alpha_2$. Therefore, they are not repeated here.

In FIG. 4K, the same equation and solution as in FIGS. 4I and 4J apply for acute angle $\alpha_1$ so they are not repeated here. However, the angular relationships at the remote vehicle RV result in the following equation:

$$\beta_1 + \pi + \alpha_2 + \pi/2 - \delta_{RV} = 2\pi.$$

Solving for acute angle $\alpha_2$ results in:

$$\alpha_2 = \pi/2 + \delta_{RV} - \beta_1.$$

In FIG. 4L, the following equations apply to the angular relationships at the host vehicle HV and the remote vehicle RV, respectively:

$$\beta_1 + \alpha_1 + \pi/2 = \delta_{HV}; \text{ and}$$

$$\beta_1 + \pi - \alpha_2 = \delta_{RV} - \pi/2.$$

Solving for acute angle $\alpha_1$ results in:

$$\alpha_1 = -(\pi/2 - \delta_{HV} + \beta_1).$$

Solving for acute angle $\alpha_2$ results in:

$$\alpha_2 = 3\pi/2 - \delta_{RV} + \beta_1.$$

Referring next to FIGS. 4M to 4P, each shows the orientation of the remote vehicle RV with different ranges for the remote vehicle heading angle $\delta_{RV}$ where the host vehicle heading angle $\delta_{HV}$ is within the range defined by $\pi/2 \leq \delta_{RV} < \pi$. In FIG. 4M, the remote vehicle heading angle $\delta_{RV}$ is, like the host vehicle heading angle $\delta_{HV}$, within the range defined by $\pi/2 \leq \delta_{RV} < \pi$. In FIG. 4N, the remote vehicle heading angle $\delta_{RV}$ is within the range defined by $0 \leq \delta_{HV} < \pi/2$. In FIG. 4O, the remote vehicle heading angle $\delta_{RV}$ is within the range defined by $3\pi/2 \leq \delta_{RV} < 2\pi$. In FIG. 4P, the remote vehicle heading angle $\delta_{RV}$ is within the range defined by $\pi \leq \delta_{RV} < 3\pi/2$. Each is oriented as shown in FIGS. 4A to 4L. The geodesic D between the host vehicle HV and the remote vehicle RV is shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. As in FIGS. 4A to 4D, these lines are both labeled R as they each correspond to the radius of curvature of the curved path P.

Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha_3$ can be calculated as $\alpha_3 = \pi - (\alpha_1 + \alpha_2)$. Determining the acute angle $\alpha_1$ between the geodesic D and line $R_{HV}$ and the acute angle $\alpha_2$ between the geodesic D and line $R_{RV}$ can be achieved using geometric equations.

In FIG. 4M, the following equations apply to the angular relationships at the host vehicle HV and the remote vehicle RV, respectively:

$$\delta_{HV} - \beta_1 = \pi/2 - \alpha_1; \text{ and}$$

$$\beta_1 + \pi + \alpha_2 + \pi/2 - \delta_{RV} = 2\pi.$$

Solving for acute angle $\alpha_1$ results in:

$$\alpha_1 = \pi/2 - \delta_{HV} + \beta_1.$$

Solving for acute angle $\alpha_2$ results in:

$$\alpha_2 = \pi/2 + \delta_{RV} - \beta_1.$$

In FIG. 4N, the same equations and solutions as in FIG. 4M apply for acute angles $\alpha_1$ and $\alpha_2$. Therefore, they are not repeated here.

In FIG. 4O, the same equation and solution as in FIGS. 4M and 4N apply for acute angle $\alpha_1$ so they are not repeated here. However, the angular relationships at the remote vehicle RV result in the following equation:

$$\beta_1 + \pi + \alpha_2 + \pi/2 = \delta_{RV}.$$

Solving for acute angle $\alpha_2$ results in:

$$\alpha_2 = -(3\pi/2 - \delta_{RV} + \beta_1).$$

In FIG. 4P, the following equations apply to the angular relationships at the host vehicle HV and the remote vehicle RV, respectively:

$$\beta_1 + \alpha_1 + \pi/2 - \delta_{HV} = 2\pi; \text{ and}$$

$$\delta_{RV} - (\beta_1 - \pi) = \pi/2 - \alpha_2.$$

Solving for acute angle $\alpha_1$ results in:

$$\alpha_1 = 3\pi/2 + \delta_{HV} - \beta_1.$$

Solving for acute angle $\alpha_2$ results in:

$$\alpha_2 = -(\pi/2 + \delta_{RV} - \beta_1).$$

As mentioned above, the cases described with reference to FIGS. 4A to 4P result from sixteen possible heading angle combinations of a host vehicle heading angle $\delta_{HV}$ and a remote vehicle heading angle $\delta_{RV}$ in a left-hand curve. Hence, they result in sixteen combinations of values for acute angle $\alpha 1$ and acute angle $\alpha_2$. These left-hand curve results for acute angle $\alpha_1$ and acute angle $\alpha_2$ may be summarized in matrix form expressions as shown respectively in Table 1 and Table 2 below. In Tables 1 and 2, the variables m and n are matrix locations and the variable L indicates that the data is related to a left-hand curve.

TABLE 1

| $\alpha_{1_{m,n}} =$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $0 \leq \delta_{HV} < \pi/2$ | $\alpha_{1L_{1,1}} =$ $\pi/2 - \delta_{HV} + \beta_1$ | $\alpha_{1L_{1,2}} =$ $3\pi/2 + \delta_{HV} - \beta_1$ | $\alpha_{1L_{1,3}} =$ $-(3\pi/2 + \delta_{HV} - \beta_1)$ | $\alpha_{1L_{1,4}} =$ $\pi/2 - \delta_{HV} + \beta_1$ |
| $\pi/2 \leq \delta_{HV} < \pi$ | $\alpha_{1L_{2,1}} =$ $\pi/2 - \delta_{HV} + \beta_1$ | $\alpha_{1L_{2,2}} =$ $\pi/2 - \delta_{HV} + \beta_1$ | $\alpha_{1L_{2,3}} =$ $3\pi/2 + \delta_{HV} - \beta_1$ | $\alpha_{1L_{2,4}} =$ $\pi/2 - \delta_{HV} + \beta_1$ |

TABLE 1-continued

| $\alpha_{1_{m,n}} =$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $\pi \leq \delta_{HV} < 3\pi/2$ | $\alpha_{1L_{3,1}} = \pi/2 - \delta_{HV} + \beta_1$ | $\alpha_{1L_{3,2}} = \pi/2 - \delta_{HV} + \beta_1$ | $\alpha_{1L_{3,3}} = \pi/2 - \delta_{HV} + \beta_1$ | $\alpha_{1L_{3,4}} = -(\pi/2 - \delta_{HV} + \beta_1)$ |
| $3\pi/2 \leq \delta_{HV} < 2\pi$ | $\alpha_{1L_{4,1}} = -(\pi/2 - \delta_{HV} + \beta_1)$ | $\alpha_{1L_{4,2}} = \pi/2 - \delta_{HV} + \beta_1$ | $\alpha_{1L_{4,3}} = \pi/2 - \delta_{HV} + \beta_1$ | $\alpha_{1L_{4,4}} = \pi/2 - \delta_{HV} + \beta_1$ |

TABLE 2

| $\alpha_{2_{m,n}} =$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $0 \leq \delta_{HV} < \pi/2$ | $\alpha_{2L_{1,1}} = \pi/2 + \delta_{RV} - \beta_1$ | $\alpha_{2L_{1,2}} = -(\pi/2 + \delta_{RV} - \beta_1)$ | $\alpha_{2L_{1,3}} = \pi/2 + \delta_{RV} - \beta_1$ | $\alpha_{2L_{1,4}} = -(3\pi/2 - \delta_{RV} + \beta_1)$ |
| $\pi/2 \leq \delta_{HV} < \pi$ | $\alpha_{2L_{2,1}} = \pi/2 + \delta_{RV} - \beta_1$ | $\alpha_{2L_{2,2}} = \pi/2 + \delta_{RV} - \beta_1$ | $\alpha_{2L_{2,3}} = -(\pi/2 + \delta_{RV} - \beta_1)$ | $\alpha_{2L_{2,4}} = -(3\pi/2 - \delta_{RV} + \beta_1)$ |
| $\pi \leq \delta_{HV} < 3\pi/2$ | $\alpha_{2L_{3,1}} = \pi/2 + \delta_{RV} - \beta_1$ | $\alpha_{2L_{3,2}} = \pi/2 + \delta_{RV} - \beta_1$ | $\alpha_{2L_{3,3}} = \pi/2 + \delta_{RV} - \beta_1$ | $\alpha_{2L_{3,4}} = 3\pi/2 - \delta_{RV} + \beta_1$ |
| $3\pi/2 \leq \delta_{HV} < 2\pi$ | $\alpha_{2L_{4,1}} = -(\pi/2 + \delta_{RV} - \beta_1)$ | $\alpha_{2L_{4,2}} = \pi/2 + \delta_{RV} - \beta_1$ | $\alpha_{2L_{4,3}} = \pi/2 + \delta_{RV} - \beta_1$ | $\alpha_{2L_{4,4}} = \pi/2 + \delta_{RV} - \beta_1$ |

To calculate path length L, an angle extending along the curved path P between the host vehicle HV and the remote vehicle RV is desirable. This is called the path angle herein. In most cases shown in FIGS. 4A to 4P, determining the intersect angle $\alpha_3$ as $\pi - (\alpha_1 + \alpha_2)$ is sufficient to find the path angle. However, in cases where the range of angles for the host vehicle heading angle $\delta_{HV}$ is adjacent to the range of angles for the remote vehicle heading angle $\delta_{RV}$ in the direction of the curve or turn, the path angle extending along the curved path P between the host vehicle HV and the remote vehicle RV is no longer less than $\pi$ (that is, 180 degrees). Thus, the intersect angle $\alpha_3$ is not equal to the path angle. Instead, the path angle for calculating path length L is $\alpha'_3$ for those situations shown in FIGS. 4D, 4H, 4L and 4P where $\alpha'_3 = 2\pi - \alpha_3$. Substituting $\pi - (\alpha_1 + \alpha_2)$ for $\alpha_3$ results in $\alpha'_3 = 2\pi - (\pi - (\alpha_1 + \alpha_2))$, which simplifies to $\alpha'_3 = \pi + (\alpha_1 + \alpha_2)$. For all other cases, the path angle $\alpha'_3$ is equal to the intersect angle $\alpha_3$. Table 3 below shows in matrix form expressions for the path angle $\alpha'_3$ for the combinations in Tables 1 and 2 above according to $\alpha'_3 = \pi - (\alpha_1 + \alpha_2)$ for all cases except for the special cases, where $\alpha'_3 = \pi + (\alpha_1 + \alpha_2)$. The values acute angles $\alpha_1$ and $\alpha_2$ for these special cases are shaded in Tables 1 and 2 for easier reference.

TABLE 3

| $\alpha'_{3_{m,n}}$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $0 \leq \delta_{HV} < \pi/2$ | $\alpha_{3L_{1,1}} = \delta_{HV} - \delta_{RV}$ | $\alpha_{3L_{1,2}} = 2\pi + \delta_{HV} - \delta_{RV}$ | $\alpha_{3L_{1,3}} = 2\pi + \delta_{HV} - \delta_{RV}$ | $\alpha_{3L_{1,4}} = 2\pi + \delta_{HV} - \delta_{RV}$ |
| $\pi/2 \leq \delta_{HV} < \pi$ | $\alpha_{3L_{2,1}} = \delta_{HV} - \delta_{RV}$ | $\alpha_{3L_{2,2}} = \delta_{HV} - \delta_{RV}$ | $\alpha_{3L_{2,3}} = 2\pi + \delta_{HV} - \delta_{RV}$ | $\alpha_{3L_{2,4}} = 2\pi + \delta_{HV} - \delta_{RV}$ |
| $\pi \leq \delta_{HV} < 3\pi/2$ | $\alpha_{3L_{3,1}} = \delta_{HV} - \delta_{RV}$ | $\alpha_{3L_{3,2}} = \delta_{HV} - \delta_{RV}$ | $\alpha_{3L_{3,3}} = \delta_{HV} - \delta_{RV}$ | $\alpha_{3L_{3,4}} = 2\pi + \delta_{HV} - \delta_{RV}$ |
| $3\pi/2 \leq \delta_{HV} < 2\pi$ | $\alpha_{3L_{4,1}} = \delta_{HV} - \delta_{RV}$ | $\alpha_{3L_{4,2}} = \delta_{HV} - \delta_{RV}$ | $\alpha_{3L_{4,3}} = \delta_{HV} - \delta_{RV}$ | $\alpha_{3L_{4,4}} = \delta_{HV} - \delta_{RV}$ |

A similar analysis applies to FIGS. 5A to 5P for sixteen possible heading angle combinations for the right-hand curve.

Specifically, and referring first to FIGS. 5A to 5D, each shows the orientation of the remote vehicle RV with different ranges for the remote vehicle heading angle $\delta_{RV}$ where the host vehicle heading angle $\delta_{HV}$ is within the range defined by $0 \leq \delta_{HV} < \pi/2$. In FIG. 5A, the remote vehicle heading angle $\delta_{RV}$ is, like the host vehicle heading angle $\delta_{HV}$, within the range defined by $0 \leq \delta_{HV} < \pi/2$. In FIG. 5B, the remote vehicle heading angle $\delta_{RV}$ is within the range defined by $\pi/2 \leq \delta_{RV} < \pi$. In FIG. 5C, the remote vehicle heading angle $\delta_{RV}$ is within the range defined by $\pi \leq \delta_{RV} < 3\pi/2$. In FIG. 5D, the remote vehicle heading angle $\delta_{RV}$ is within the range defined by $3\pi/2 \leq \delta_{RV} < 2\pi$. Each is oriented as shown in the example of FIG. 3, that is, with the reference direction relative to the host vehicle being north. Again, this is not required; only a consistency in the reference direction once defined is required. The geodesic D between the host vehicle HV and the remote vehicle RV is also shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. In FIGS. 5A to 5D, these lines are both labeled R as they each correspond to the radius of curvature of the curved path P. Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha 3$ can be calculated as $\alpha_3 = \pi - (\alpha_1 + \alpha_2)$. Determining the acute angle $\alpha_1$ between the geodesic D and line $R_{HV}$ and the acute angle $\alpha_2$ between the geodesic D and line $R_{RV}$ can be achieved using geometric equations.

In FIG. 5A, the following equations apply to the angular relationships at the host vehicle HV and the remote vehicle RV, respectively:

$$\pi/2+\delta_{HV}=\alpha_1+\beta_1; \text{ and}$$

$$\delta_{RV}-\beta_1+\pi/2+\alpha_2=\pi.$$

Solving for acute angle $\alpha_1$ results in:

$$\alpha_1=\pi/2+\delta_{HV}-\beta_1$$

Solving for acute angle $\alpha_2$ results in:

$$\alpha_2=\pi/2-\delta_{RV}+\beta_1.$$

In FIG. 5B, the same equations and solutions as in FIG. 5A apply for acute angles $\alpha_1$ and $\alpha_2$, so they are not repeated here.

In FIG. 5C, the same equations and solutions as in FIGS. 5A and 5B apply for acute angles $\alpha_1$ and $\alpha_2$, so they are not repeated here.

In FIG. 5D, the following equations apply to the angular relationships at the host vehicle HV and the remote vehicle RV, respectively:

$$\delta_{HV}+\pi/2+\alpha_1=\beta_1; \text{ and}$$

$$\delta_{RV}+\pi/2-\alpha_2-(\beta_1-\pi)_1=2\pi.$$

Solving for acute angle $\alpha_1$ results in:

$$\alpha_1=-(\pi/2+\delta_{HV}-\beta_1)$$

Solving for acute angle $\alpha_2$ results in:

$$\alpha_2=-(\pi/2-\delta_{RV}+\beta^1).$$

Referring next to FIGS. 5E to 5H, each shows the orientation of the remote vehicle RV with different ranges for the remote vehicle heading angle $\delta_{RV}$ where the host vehicle heading angle $\delta_{HV}$ is within the range defined by $\pi/2 \leq \delta_{HV} < \pi$. In FIG. 5E, the remote vehicle heading angle $\delta_{RV}$ is, like the host vehicle heading angle $\delta_{HV}$, within the range defined by $\pi/2 \leq \delta_{RV} < \pi$. In FIG. 5F, the remote vehicle heading angle $\delta_{RV}$ is within the range defined by $\pi \leq \delta_{RV} < 3\pi/2$. In FIG. 5G, the remote vehicle heading angle $\delta_{RV}$ is within the range defined by $3\pi/2 \leq \delta_{RV} < 2\pi$. In FIG. 5H, the remote vehicle heading angle $\delta_{RV}$ is within the range defined by $0 \leq \delta_{HV} < \pi/2$. Each is oriented as shown in FIGS. 5A to 5D. The geodesic D between the host vehicle HV and the remote vehicle RV is shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. As in FIGS. 5A to 5D, these lines are both labeled R as they each correspond to the radius of curvature of the curved path P.

Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha 3$ can be calculated as $\alpha_3=\pi-(\alpha_1+\alpha_2)$. Determining the acute angle $\alpha_1$ between the geodesic D and line $R_{HV}$ and the acute angle $\alpha_2$ between the geodesic D and line $R_{RV}$ can be achieved using geometric equations.

In FIG. 5E, the following equations apply to the angular relationships at the host vehicle HV and the remote vehicle RV, respectively:

$$\pi/2+\delta_{HV}=\alpha_1+\beta_1; \text{ and}$$

$$\delta_{RV}-\beta_1+\pi/2+\alpha_2=\pi.$$

Solving for acute angle $\alpha_1$ results in:

$$\alpha_1=\pi/2+\delta_{HV}-\beta_1.$$

Solving for acute angle $\alpha_2$ results in:

$$\alpha_2=\pi/2-\delta_{RV}+\beta^1.$$

In FIG. 5F, the same equations and solutions as in FIG. 5E apply for acute angles $\alpha_1$ and $\alpha_2$. Therefore, they are not repeated here.

In FIG. 5G, the same equations and solutions as in FIGS. 5E and 5F apply for acute angle $\alpha_1$ so they are not repeated here. However, the angular relationships at the remote vehicle RV result in the following equation:

$$\delta_{RV}+\pi/2-(\beta_1-\pi-\alpha_2)=2\pi.$$

Solving for acute angle $\alpha_2$ results in:

$$\alpha_2=\pi/2-\delta_{RV}+\beta_1.$$

In FIG. 5H, the following equations apply to the angular relationships at the host vehicle HV and the remote vehicle RV, respectively:

$$\delta_{HV}+\pi/2+\alpha_1=\beta_1; \text{ and}$$

$$\delta_{RV}+\pi/2=\beta_1-\pi+\alpha_2.$$

Solving for acute angle $\alpha_1$ results in:

$$\alpha_1=-(\pi/2+\delta_{HV}-\beta_1).$$

Solving for acute angle $\alpha_2$ results in:

$$\alpha_2=3\pi/2+\delta_{RV}-\beta_1.$$

Referring next to FIGS. 5I to 5L, each shows the orientation of the remote vehicle RV with different ranges for the remote vehicle heading angle $\delta_{RV}$ where the host vehicle heading angle $\delta_{HV}$ is within the range defined by $\pi \leq \delta_{RV} < 3\pi/2$. In FIG. 5I, the remote vehicle heading angle $\delta_{RV}$ is, like the host vehicle heading angle $\delta_{HV}$, within the range defined by $\pi \leq \delta_{RV} < 3\pi/2$. In FIG. 5J, the remote vehicle heading angle $\delta_{RV}$ is within the range defined by $3\pi/2 \leq \delta_{RV} < 2\pi$. In FIG. 5K, the remote vehicle heading angle $\delta_{RV}$ is within the range defined by $0 \leq \delta_{HV} < \pi/2$. In FIG. 5L, the remote vehicle heading angle $\delta_{RV}$ is within the range defined by $\pi/2 \leq \delta_{RV} < \pi$. Each is oriented as shown in FIGS. 5A to 5H. The geodesic D between the host vehicle HV and the remote vehicle RV is shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. As in FIGS. 5A to 5D, these lines are both labeled R as they each correspond to the radius of curvature of the curved path P.

Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha_3$ can be calculated as $\alpha_3=\pi-(\alpha_1+\alpha_2)$. Determining the acute angle $\alpha_1$ between the geodesic D and line $R_{HV}$ and the acute angle $\alpha_2$ between the geodesic D and line $R_{RV}$ can be achieved using geometric equations.

In FIG. 5I, the following equations apply to the angular relationships at the host vehicle HV and the remote vehicle RV, respectively:

$$\pi/2+\delta_{HV}=\alpha_1+\beta_1;\text{ and}$$

$$\delta_{RV}+\pi/2+\alpha_2-(\beta_1-\pi)=2\pi.$$

Solving for acute angle $\alpha_1$ results in:

$$\alpha_1=\pi/2+\delta_{HV}-\beta_1.$$

Solving for acute angle $\alpha_2$ results in:

$$\alpha_2=\pi/2-\delta_{RV}+\beta_1.$$

In FIG. 5J, the same equations and solutions as in FIG. 4I apply for acute angle $\alpha_1$ so they are not repeated here. However, the angular relationships at the remote vehicle RV result in the following equation:

$$\delta_{RV}+\pi/2-(\beta_1-\pi-\alpha_2)=2\pi.$$

Solving for acute angle $\alpha_2$ results in:

$$\alpha_2=\pi/2-\delta_{RV}+\beta_1.$$

In FIG. 5K, the following equations apply to the angular relationships at the host vehicle HV and the remote vehicle RV, respectively:

$$\delta_{HV}+\pi/2=\beta_1+\alpha_1;\text{ and}$$

$$\delta_{RV}+\pi/2+\alpha_2=\beta_1-\pi.$$

Solving for acute angle $\alpha_1$ results in:

$$\alpha_1=\pi/2+\delta_{HV}-\beta_1.$$

Solving for acute angle $\alpha_2$ results in:

$$\alpha_2=-(3\pi/2+\delta_{RV}-\beta_1).$$

In FIG. 5L, the following equations apply to the angular relationships at the host vehicle HV and the remote vehicle RV, respectively:

$$\delta_{HV}+\pi/2+\alpha_1-\beta_1=2\pi;\text{ and}$$

$$\delta_{RV}+\pi/2=\beta_1+\pi+\alpha_2.$$

Solving for acute angle $\alpha_1$ results in:

$$\alpha_1=3\pi/2-\delta_{HV}+\beta_1.$$

Solving for acute angle $\alpha_2$ results in:

$$\alpha_2=-(\pi/2-\delta_{RV}+\beta_1).$$

Referring next to FIGS. 5M to 5P, each shows the orientation of the remote vehicle RV with different ranges for the remote vehicle heading angle $\delta_{RV}$ where the host vehicle heading angle $\delta_{HV}$ is within the range defined by $3\pi/2\leq\delta_{RV}<2\pi$. In FIG. 5M, the remote vehicle heading angle $\delta_{RV}$ is, like the host vehicle heading angle $\delta_{HV}$, within the range defined by $3\pi/2\leq\delta_{RV}<2\pi$. In FIG. 5N, the remote vehicle heading angle $\delta_{RV}$ is within the range defined by $0\leq\delta_{HV}<\pi/2$. In FIG. 5O, the remote vehicle heading angle $\delta_{RV}$ is within the range defined by $\pi/2\leq\delta_{RV}<\pi$. In FIG. 5P, the remote vehicle heading angle $\delta_{RV}$ is within the range defined by $\pi\leq\delta_{RV}<3\pi/2$. Each is oriented as shown in FIGS. 5A to 5L. The geodesic D between the host vehicle HV and the remote vehicle RV is shown, as is the convergence angle $\beta_1$.

To determine the angle extending along the curved path P between the host vehicle HV and the remote vehicle RV, the radius of curvature R is first determined. More specifically, the host vehicle heading angle $\delta_{HV}$ defines a host vehicle trajectory at a particular geospatial location along the curved path P. Similarly, the remote vehicle heading angle $\delta_{RV}$ defines a remote vehicle trajectory at a particular geospatial location along the curved path P. A line perpendicular to the trajectory and extending from each vehicle to the left relative to the trajectory intersect at an intersect angle $\alpha_3$. As in FIGS. 5A to 5D, these lines are both labeled R as they each correspond to the radius of curvature of the curved path P.

Together with the geodesic D, lines R form a triangle. Accordingly, by determining the acute angle $\alpha_1$ between the geodesic D and line $R_{HV}$ and the acute angle $\alpha_2$ between the geodesic D and line $R_{RV}$, the intersect angle $\alpha_3$ can be calculated as $\alpha_3=\pi-(\alpha_1+\alpha_2)$. Determining the acute angle $\alpha_1$ between the geodesic D and line $R_{HV}$ and the acute angle $\alpha_2$ between the geodesic D and line $R_{RV}$ can be achieved using geometric equations.

In FIG. 5M, the following equations apply to the angular relationships at the host vehicle HV and the remote vehicle RV, respectively:

$$\beta_1-\delta_{HV}=\pi/2-\alpha_1;\text{ and}$$

$$\delta_{RV}+\pi/2+\alpha_2-(\beta_1-\pi)=2\pi.$$

Solving for acute angle $\alpha_1$ results in:

$$\alpha_1=\pi/2+\delta_{HV}-\beta_1.$$

Solving for acute angle $\alpha_2$ results in:

$$\alpha_2=\pi/2-\delta_{RV}+\beta_1.$$

In FIG. 5N, the same equation and solution as in FIG. 4M apply for acute angle $\alpha_1$ so they are not repeated here. However, the angular relationships at the remote vehicle RV result in the following equation:

$$\delta_{RV}+\pi/2+\alpha_2=\beta_1-\pi.$$

Solving for acute angle $\alpha_2$ results in:

$$\alpha_2=-(3\pi/2+\delta_{RV}-\beta_1).$$

In FIG. 5O, the following equations apply to the angular relationships at the host vehicle HV and the remote vehicle RV, respectively:

$$\delta_{HV}+\pi/2-\beta_1-\alpha_1=2\pi;\text{ and}$$

$$\delta_{RV}+\pi/2+\alpha_2-\beta_1=\pi.$$

Solving for acute angle $\alpha_1$ results in:

$$\alpha_1=-(3\pi/2-\delta_{HV}+\beta_1).$$

Solving for acute angle $\alpha_2$ results in:

$$\alpha_2=\pi/2-\delta_{RV}+\beta_1.$$

In FIG. 5P, the following equations apply to the angular relationships at the host vehicle HV and the remote vehicle RV, respectively:

$$\delta_{HV}+\pi/2+\alpha_1-\beta_1=2\pi;\text{ and}$$

$$\beta_1+\pi+\alpha_2=\delta_{RV}+\pi/2.$$

Solving for acute angle $\alpha_1$ results in:

$$\alpha_1=3\pi/2-\delta_{HV}+\beta_1.$$

Solving for acute angle $\alpha_2$ results in:

$$\alpha_2=-(\pi/2-\delta_{RV}+\beta_1).$$

As mentioned above, the cases described with reference to FIGS. 5A to 5P result from sixteen possible heading angle combinations of a host vehicle heading angle $\delta_{HV}$ and a remote vehicle heading angle $\delta_{RV}$ in a right-hand curve. Hence, they result in sixteen combinations of values for acute angle $\alpha_1$ and acute angle $\alpha_2$. These right-hand curve results for acute angle $\alpha_1$ and acute angle $\alpha_2$ may be summarized in matrix form expressions as shown respectively in Table 4 and Table 5 below. In Tables 4 and 5, the variables m and n are matrix locations and the variable R indicates that the data relates to a right-hand curve.

While there are sixteen possible values for the angles $\alpha_1$, $\alpha_2$ and $\alpha'_3$ for each of a left curve and right curve, it is desirable to have a single equation for each angle. To that end, a combination matrix $F_{m,n}$ of normalizing values H1

TABLE 4

| $\alpha_{1_{m,n}} =$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $0 \leq \delta_{HV} < \pi/2$ | $\alpha_{1R_{1,1}} =$ $\pi/2 + \delta_{HV} - \beta_1$ | $\alpha_{1R_{1,2}} =$ $\pi/2 + \delta_{HV} - \beta_1$ | $\alpha_{1R_{1,3}} =$ $\pi/2 + \delta_{HV} - \beta_1$ | $\alpha_{1R_{1,4}} =$ $-(\pi/2 + \delta_{HV} - \beta_1)$ |
| $\pi/2 \leq \delta_{HV} < \pi$ | $\alpha_{1R_{2,1}} =$ $-(\pi/2 + \delta_{HV} - \beta_1)$ | $\alpha_{1R_{2,2}} =$ $\pi/2 + \delta_{HV} - \beta_1$ | $\alpha_{1R_{2,3}} =$ $\pi/2 + \delta_{HV} - \beta_1$ | $\alpha_{1R_{2,4}} =$ $\pi/2 + \delta_{HV} - \beta_1$ |
| $\pi \leq \delta_{HV} < 3\pi/2$ | $\alpha_{1R_{3,1}} =$ $\pi/2 + \delta_{HV} - \beta_1$ | $\alpha_{1R_{3,2}} =$ $3\pi/2 - \delta_{HV} + \beta_1$ | $\alpha_{1R_{3,3}} =$ $\pi/2 + \delta_{HV} - \beta_1$ | $\alpha_{1R_{3,4}} =$ $\pi/2 + \delta_{HV} - \beta_1$ |
| $3\pi/2 \leq \delta_{HV} < 2\pi$ | $\alpha_{1R_{4,1}} =$ $\pi/2 + \delta_{HV} - \beta_1$ | $\alpha_{1R_{4,2}} =$ $-(3\pi/2 - \delta_{HV} + \beta_1)$ | $\alpha_{1R_{4,3}} =$ $3\pi/2 - \delta_{HV} + \beta_1$ | $\alpha_{1R_{4,4}} =$ $\pi/2 + \delta_{HV} - \beta_1$ |

TABLE 5

| $\alpha_{2_{m,n}} =$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $0 \leq \delta_{HV} < \pi/2$ | $\alpha_{2R_{1,1}} =$ $\pi/2 - \delta_{RV} + \beta_1$ | $\alpha_{2R_{1,2}} =$ $\pi/2 - \delta_{RV} + \beta_1$ | $\alpha_{2R_{1,3}} =$ $\pi/2 - \delta_{RV} + \beta_1$ | $\alpha_{2R_{1,4}} =$ $-(\pi/2 - \delta_{RV} + \beta_1)$ |
| $\pi/2 \leq \delta_{HV} < \pi$ | $\alpha_{2R_{2,1}} =$ $3\pi/2 + \delta_{RV} - \beta_1$ | $\alpha_{2R_{2,2}} =$ $\pi/2 - \delta_{RV} + \beta_1$ | $\alpha_{2R_{2,3}} =$ $\pi/2 - \delta_{RV} + \beta_1$ | $\alpha_{2R_{2,4}} =$ $\pi/2 - \delta_{RV} + \beta_1$ |
| $\pi \leq \delta_{HV} < 3\pi/2$ | $\alpha_{2R_{3,1}} =$ $-(3\pi/2 + \delta_{RV} - \beta_1)$ | $\alpha_{2R_{3,2}} =$ $-(\pi/2 - \delta_{RV} + \beta_1)$ | $\alpha_{2R_{3,3}} =$ $\pi/2 - \delta_{RV} + \beta_1$ | $\alpha_{2R_{3,4}} =$ $\pi/2 - \delta_{RV} + \beta_1$ |
| $3\pi/2 \leq \delta_{HV} < 2\pi$ | $\alpha_{2R_{4,1}} =$ $-(3\pi/2 + \delta_{RV} - \beta_1)$ | $\alpha_{2R_{4,2}} =$ $\pi/2 - \delta_{RV} + \beta_1$ | $\alpha_{2R_{4,3}} =$ $-(\pi/2 - \delta_{RV} + \beta_1)$ | $\alpha_{2R_{4,4}} =$ $\pi/2 - \delta_{RV} + \beta_1$ |

To calculate path length L, an angle extending along the curved path P between the host vehicle HV and the remote vehicle RV is desirable. This is called the path angle herein. In most cases shown in FIGS. 5A to 5P, determining the intersect angle $\alpha_3$ as $\pi-(\alpha_1+\alpha_2)$ is sufficient to find the path angle. However, in cases where the range of angles for the host vehicle heading angle $\delta_{HV}$ is adjacent to the range of angles for the remote vehicle heading angle $\delta_{RV}$ in the direction of the curve or turn, the path angle extending along the curved path P between the host vehicle HV and the remote vehicle HV is no longer less than π (that is, 180 degrees). Thus, the intersect angle $\alpha_3$ is not equal to the path angle. Instead, the path angle for calculating path length L is $\alpha'_3$ for those situations shown in FIGS. 5D, 5H, 5L and 5P where $\alpha'_3=2\pi-\alpha_3$. Substituting $\pi-(\alpha_1+\alpha_2)$ for $\alpha_3$ results in $\alpha'_3=2\pi-(\pi-(\alpha_1+\alpha_2))$, which simplifies to $\alpha'_3=\pi+(\alpha_1+\alpha_2)$. For all other cases, the path angle $\alpha'_3$ is equal to the intersect angle $\alpha_3$. Table 6 below shows in matrix form expressions for the path angle $\alpha'_3$ for the combinations in Tables 4 and 5 above according to $\alpha'_3=\pi-(\alpha_1+\alpha_2)$ for all cases except for the special cases, where $\alpha'_3=\pi+(\alpha_1+\alpha_2)$. The values acute angles $\alpha_1$ and $\alpha_2$ for these special cases are shaded in Tables 4 and 5 for easier reference.

through $H_4$ associated with the vehicle heading angle $\delta_{HV}$ and normalizing values $R_1$ through $R_4$ associated with the remote vehicle heading angle $\delta_{RV}$ may be expressed as shown in Table 7.

TABLE 7

| $F_{m,n}$ | $R_1$ | $R_2$ | $R_3$ | $R_4$ |
|---|---|---|---|---|
| $H_1$ | $F_{1,1} = H_1 \times R_1$ | $F_{1,2} = H_1 \times R_2$ | $F_{1,3} = H_1 \times R_3$ | $F_{1,4} = H_1 \times R_4$ |
| $H_2$ | $F_{2,1} = H_2 \times R_1$ | $F_{2,2} = H_2 \times R_2$ | $F_{2,3} = H_2 \times R_3$ | $F_{2,4} = H_2 \times R_4$ |
| $H_3$ | $F_{3,1} = H_3 \times R_1$ | $F_{3,2} = H_3 \times R_2$ | $F_{3,3} = H_3 \times R_3$ | $F_{3,4} = H_3 \times R_4$ |
| $H_4$ | $F_{4,1} = H_4 \times R_1$ | $F_{4,2} = H_4 \times R_2$ | $F_{4,3} = H_4 \times R_3$ | $F_{4,4} = H_4 \times R_4$ |

In Table 7, $H_1$ through $H_4$ are calculated as in Table 8 below.

TABLE 8

| $H_1$ | $\frac{1}{4}\left[\frac{\delta_{HV} - 0 + \sigma}{|\delta_{HV} - 0| + \sigma} + 1\right] \times \left[\frac{0.5\pi - \delta_{HV} - \sigma}{|0.5\pi - \delta_{HV}| + \sigma} + 1\right]$ |
|---|---|
| $H_2$ | $\frac{1}{4}\left[\frac{\delta_{HV} - 0.5\pi + \sigma}{|\delta_{HV} - 0.5\pi| + \sigma} + 1\right] \times \left[\frac{\pi - \delta_{HV} - \sigma}{|\pi - \delta_{HV}| + \sigma} + 1\right]$ |

TABLE 6

| $\alpha'_{3_{m,n}}$ | $0 \leq \delta_{RV} < \pi/2$ | $\pi/2 \leq \delta_{RV} < \pi$ | $\pi \leq \delta_{RV} < 3\pi/2$ | $3\pi/2 \leq \delta_{RV} < 2\pi$ |
|---|---|---|---|---|
| $0 \leq \delta_{HV} < \pi/2$ | $\alpha_{3R_{1,1}} = \delta_{RV} - \delta_{HV}$ | $\alpha_{3R_{1,2}} = \delta_{RV} - \delta_{HV}$ | $\alpha_{3R_{1,3}} = \delta_{RV} - \delta_{HV}$ | $\alpha_{3R_{1,4}} = \delta_{RV} - \delta_{HV}$ |
| $\pi/2 \leq \delta_{HV} < \pi$ | $\alpha_{3R_{2,1}} = 2\pi + \delta_{RV} - \delta_{HV}$ | $\alpha_{3R_{2,2}} = \delta_{RV} - \delta_{HV}$ | $\alpha_{3R_{2,3}} = \delta_{RV} - \delta_{HV}$ | $\alpha_{3R_{2,4}} = \delta_{RV} - \delta_{HV}$ |
| $\pi \leq \delta_{HV} < 3\pi/2$ | $\alpha_{3R_{3,1}} = 2\pi + \delta_{RV} - \delta_{RV}$ | $\alpha_{3R_{3,2}} = 2\pi + \delta_{RV} - \delta_{HV}$ | $\alpha_{3R_{3,3}} = \delta_{RV} - \delta_{HV}$ | $\alpha_{3R_{3,4}} = \delta_{RV} - \delta_{HV}$ |
| $3\pi/2 \leq \delta_{HV} < 2\pi$ | $\alpha_{3R_{4,1}} = 2\pi + \delta_{RV} - \delta_{HV}$ | $\alpha_{3R_{4,2}} = 2\pi + \delta_{RV} - \delta_{HV}$ | $\alpha_{3R_{4,3}} = 2\pi + \delta_{RV} - \delta_{HV}$ | $\alpha_{3R_{4,4}} = \delta_{RV} - \delta_{HV}$ |

TABLE 8-continued

| | |
|---|---|
| $H_3$ | $\frac{1}{4}\left[\frac{\delta_{HV} - \pi + \sigma}{|\delta_{HV} - \pi| + \sigma} + 1\right] \times \left[\frac{1.5\pi - \delta_{HV} - \sigma}{|1.5\pi - \delta_{HV}| + \sigma} + 1\right]$ |
| $H_4$ | $\frac{1}{4}\left[\frac{\delta_{HV} - 1.5\pi + \sigma}{|\delta_{HV} - 1.5\pi| + \sigma} + 1\right] \times \left[\frac{2\pi - \delta_{HV} - \sigma}{|2\pi - \delta_{HV}| + \sigma} + 1\right]$ |

In Table 7, $R_1$ though $R_4$ are calculated as in Table 9 below.

TABLE 9

| | |
|---|---|
| $R_1$ | $\frac{1}{4}\left[\frac{\delta_{RV} - 0 + \sigma}{|\delta_{RV} - 0| + \sigma} + 1\right] \times \left[\frac{0.5\pi - \delta_{RV} - \sigma}{|0.5\pi - \delta_{RV}| + \sigma} + 1\right]$ |
| $R_2$ | $\frac{1}{4}\left[\frac{\delta_{RV} - 0.5\pi + \sigma}{|\delta_{RV} - 0.5\pi| + \sigma} + 1\right] \times \left[\frac{\pi - \delta_{RV} - \sigma}{|\pi - \delta_{RV}| + \sigma} + 1\right]$ |
| $R_3$ | $\frac{1}{4}\left[\frac{\delta_{RV} - \pi + \sigma}{|\delta_{RV} - \pi| + \sigma} + 1\right] \times \left[\frac{1.5\pi - \delta_{RV} - \sigma}{|1.5\pi - \delta_{RV}| + \sigma} + 1\right]$ |
| $R_4$ | $\frac{1}{4}\left[\frac{\delta_{RV} - 1.5\pi + \sigma}{|\delta_{RV} - 1.5\pi| + \sigma} + 1\right] \times \left[\frac{2\pi - \delta_{RV} - \sigma}{|2\pi - \delta_{RV}| + \sigma} + 1\right]$ |

The combination matrix $F_{m,n}$ is effectively a filter. As such, it can be used to filter out all but the relevant values for the value of acute angle $\alpha_1$ while in a left curve (referred to as $\alpha_{1L}$) or while in a right curve (referred to as $\alpha_{1R}$). The filtered value for $\alpha_{1L}$ is represented by the matrix in Table 10 below where:

$$\alpha_{1L} = \sum_{n=1}^{4}\sum_{m=1}^{4}(\alpha_{1L_{m,n}} \times F_{m,n})$$

TABLE 10

| | | | |
|---|---|---|---|
| $\alpha_{1L_{1,1}} \times F_{1,1}$ | $\alpha_{1L_{1,2}} \times F_{1,2}$ | $\alpha_{1L_{1,3}} \times F_{1,3}$ | $\alpha_{1L_{1,4}} \times F_{1,4}$ |
| $\alpha_{1L_{2,1}} \times F_{2,1}$ | $\alpha_{1L_{2,2}} \times F_{2,2}$ | $\alpha_{1L_{2,3}} \times F_{2,3}$ | $\alpha_{1L_{2,4}} \times F_{2,4}$ |
| $\alpha_{1L_{3,1}} \times F_{3,1}$ | $\alpha_{1L_{3,2}} \times F_{3,2}$ | $\alpha_{1L_{3,3}} \times F_{3,3}$ | $\alpha_{1L_{3,4}} \times F_{3,4}$ |
| $\alpha_{1L_{4,1}} \times F_{4,1}$ | $\alpha_{1L_{4,2}} \times F_{4,2}$ | $\alpha_{1L_{4,3}} \times F_{4,3}$ | $\alpha_{1L_{4,4}} \times F_{4,4}$ |

Similarly, the filtered value for $\alpha_{1R}$ is represented by the matrix in Table 11 below where:

$$\alpha_{1R} = \sum_{n=1}^{4}\sum_{m=1}^{4}(\alpha_{1R_{m,n}} \times F_{m,n})$$

TABLE 11

| | | | |
|---|---|---|---|
| $\alpha_{1R_{1,1}} \times F_{1,1}$ | $\alpha_{1R_{1,2}} \times F_{1,2}$ | $\alpha_{1R_{1,3}} \times F_{1,3}$ | $\alpha_{1R_{1,4}} \times F_{1,4}$ |
| $\alpha_{1R_{2,1}} \times F_{2,1}$ | $\alpha_{1R_{2,2}} \times F_{2,2}$ | $\alpha_{1R_{2,3}} \times F_{2,3}$ | $\alpha_{1R_{2,4}} \times F_{2,4}$ |
| $\alpha_{1R_{3,1}} \times F_{3,1}$ | $\alpha_{1R_{3,2}} \times F_{3,2}$ | $\alpha_{1R_{3,3}} \times F_{3,3}$ | $\alpha_{1R_{3,4}} \times F_{3,4}$ |
| $\alpha_{1R_{4,1}} \times F_{4,1}$ | $\alpha_{1R_{4,2}} \times F_{4,2}$ | $\alpha_{1R_{4,3}} \times F_{4,3}$ | $\alpha_{1R_{4,4}} \times F_{4,4}$ |

The combination matrix $F_{m,n}$ can also be used to filter out all but the relevant values for the value of acute angle $\alpha_2$ while in a left curve (referred to as $\alpha_{2L}$) or while in a right curve (referred to as $\alpha_{2R}$). The filtered value for $\alpha_{2L}$ is represented by the matrix in Table 12 below where:

$$\alpha_{2L} = \sum_{n=1}^{4}\sum_{m=1}^{4}(\alpha_{2L_{m,n}} \times F_{m,n})$$

TABLE 12

| | | | |
|---|---|---|---|
| $\alpha_{2L_{1,1}} \times F_{1,1}$ | $\alpha_{2L_{1,2}} \times F_{1,2}$ | $\alpha_{2L_{1,3}} \times F_{1,3}$ | $\alpha_{2L_{1,4}} \times F_{1,4}$ |
| $\alpha_{2L_{2,1}} \times F_{2,1}$ | $\alpha_{2L_{2,2}} \times F_{2,2}$ | $\alpha_{2L_{2,3}} \times F_{2,3}$ | $\alpha_{2L_{2,4}} \times F_{2,4}$ |
| $\alpha_{2L_{3,1}} \times F_{3,1}$ | $\alpha_{2L_{3,2}} \times F_{3,2}$ | $\alpha_{2L_{3,3}} \times F_{3,3}$ | $\alpha_{2L_{3,4}} \times F_{3,4}$ |
| $\alpha_{2L_{4,1}} \times F_{4,1}$ | $\alpha_{2L_{4,2}} \times F_{4,2}$ | $\alpha_{2L_{4,3}} \times F_{4,3}$ | $\alpha_{2L_{4,4}} \times F_{4,4}$ |

Similarly, the filtered value for $\alpha_{2R}$ is represented by the matrix in Table 13 below where:

$$\alpha_{2R} = \sum_{n=1}^{4}\sum_{m=1}^{4}(\alpha_{2R_{m,n}} \times F_{m,n})$$

TABLE 13

| | | | |
|---|---|---|---|
| $\alpha_{2R_{1,1}} \times F_{1,1}$ | $\alpha_{2R_{1,2}} \times F_{1,2}$ | $\alpha_{2R_{1,3}} \times F_{1,3}$ | $\alpha_{2R_{1,4}} \times F_{1,4}$ |
| $\alpha_{2R_{2,1}} \times F_{2,1}$ | $\alpha_{2R_{2,2}} \times F_{2,2}$ | $\alpha_{2R_{2,3}} \times F_{2,3}$ | $\alpha_{2R_{2,4}} \times F_{2,4}$ |
| $\alpha_{2R_{3,1}} \times F_{3,1}$ | $\alpha_{2R_{3,2}} \times F_{3,2}$ | $\alpha_{2R_{3,3}} \times F_{3,3}$ | $\alpha_{2R_{3,4}} \times F_{3,4}$ |
| $\alpha_{2R_{4,1}} \times F_{4,1}$ | $\alpha_{2R_{4,2}} \times F_{4,2}$ | $\alpha_{2R_{4,3}} \times F_{4,3}$ | $\alpha_{2R_{4,4}} \times F_{4,4}$ |

Finally, the combination matrix $F_{m,n}$ can be used to filter out all but the relevant values for the value of facing angle $\alpha'_3$ while in a left curve (referred to as $\alpha'_{3L}$) or while in a right curve (referred to as $\alpha'_{3R}$). The filtered value for $\alpha'_{3L}$ is represented by the matrix in Table 14 below where:

$$\alpha'_{3L} = \sum_{n=1}^{4}\sum_{m=1}^{4}(\alpha'_{3L_{m,n}} \times F_{m,n})$$

TABLE 14

| | | | |
|---|---|---|---|
| $\alpha'_{3L_{1,1}} \times F_{1,1}$ | $\alpha'_{3L_{1,2}} \times F_{1,2}$ | $\alpha'_{3L_{1,3}} \times F_{1,3}$ | $\alpha'_{3L_{1,4}} \times F_{1,4}$ |
| $\alpha'_{3L_{2,1}} \times F_{2,1}$ | $\alpha'_{3L_{2,2}} \times F_{2,2}$ | $\alpha'_{3L_{2,3}} \times F_{2,3}$ | $\alpha'_{3L_{2,4}} \times F_{2,4}$ |
| $\alpha'_{3L_{3,1}} \times F_{3,1}$ | $\alpha'_{3L_{3,2}} \times F_{3,2}$ | $\alpha'_{3L_{3,3}} \times F_{3,3}$ | $\alpha'_{3L_{3,4}} \times F_{3,4}$ |
| $\alpha'_{3L_{4,1}} \times F_{4,1}$ | $\alpha'_{3L_{4,2}} \times F_{4,2}$ | $\alpha'_{3L_{4,3}} \times F_{4,3}$ | $\alpha'_{3L_{4,4}} \times F_{4,4}$ |

Similarly, the filtered value for $\alpha'_{3R}$ is represented by the matrix in Table 15 below where:

$$\alpha'_{3R} = \sum_{n=1}^{4}\sum_{m=1}^{4}(\alpha'_{3R_{m,n}} \times F_{m,n})$$

TABLE 15

| | | | |
|---|---|---|---|
| $\alpha'_{3R_{1,1}} \times F_{1,1}$ | $\alpha'_{3L_{1,2}} \times F_{1,2}$ | $\alpha'_{3L_{1,3}} \times F_{1,3}$ | $\alpha'_{3L_{1,4}} \times F_{1,4}$ |
| $\alpha'_{3R_{2,1}} \times F_{2,1}$ | $\alpha'_{3R_{2,2}} \times F_{2,2}$ | $\alpha'_{3R_{2,3}} \times F_{2,3}$ | $\alpha'_{3R_{2,4}} \times F_{2,4}$ |
| $\alpha'_{3R_{3,1}} \times F_{3,1}$ | $\alpha'_{3R_{3,2}} \times F_{3,2}$ | $\alpha'_{3R_{3,3}} \times F_{3,3}$ | $\alpha'_{3R_{3,4}} \times F_{3,4}$ |
| $\alpha'_{3R_{4,1}} \times F_{4,1}$ | $\alpha'_{3R_{4,2}} \times F_{4,2}$ | $\alpha'_{3R_{4,3}} \times F_{4,3}$ | $\alpha'_{3R_{4,4}} \times F_{4,4}$ |

The matrices above produce two values each for $\alpha_1$, $\alpha_2$ and $\alpha'_3$—one for left-hand curves and one for right-hand curves. Whether the curved path P includes a left-hand curve or a right-hand curve may be determined by calculating one or both of two operators L and R. Operators L and R may also be called, respectively, left and right probability operators. Operator L may be calculated by:

$$L = \sum_{n=1}^{4}\sum_{m=1}^{4} L_{m,n}$$

where each value of $L_{m,n}$ is calculated according to Equation (3) below:

$$\frac{1}{4}\left[\frac{\alpha'_{3L_{m,n}} \times F_{m,n} - 0 - \sigma}{|\alpha'_{3L_{m,n}} \times F_{m,n} - 0| + \sigma} + 1\right] \times \left[\frac{\pi - \alpha'_{3L_{m,n}} \times F_{m,n} - 0 - \sigma}{|\pi - \alpha'_{3L_{m,n}} \times F_{m,n} - 0| + \sigma} + 1\right]$$

Operator R may be calculated by:

$$R = \sum_{n=1}^{4}\sum_{m=1}^{4} R_{m,n}$$

where each value of $R_{m,n}$ is calculated according to Equation (3) below:

$$\frac{1}{4}\left[\frac{\alpha'_{3R_{m,n}} \times F_{m,n} - 0 - \sigma}{|\alpha'_{3R_{m,n}} \times F_{m,n} - 0| + \sigma} + 1\right] \times \left[\frac{\pi - \alpha'_{3R_{m,n}} \times F_{m,n} - 0 - \sigma}{|\pi - \alpha'_{3R_{m,n}} \times F_{m,n} - 0| + \sigma} + 1\right]$$

If L=1, the host vehicle is in a left-hand curve and hence the curved path is curved in the left direction relative to the reference direction. Otherwise, if R=1, the host vehicle is in a right-hand curve and hence the curved path is curved in the right direction relative to the reference direction. For this reason, the angles $\alpha_1$, $\alpha_2$ and $\alpha'_{3L}$ can be generally defined using operators L and R and the results of Tables 10 to 15 as follows:

$$a_1 = L \times \sum_{n=1}^{4}\sum_{m=1}^{4}(\alpha_{1L_{m,n}} \times F_{m,n}) + R \times \sum_{n=1}^{4}\sum_{m=1}^{4}(\alpha_{1R_{m,n}} \times F_{m,n})$$

$$a_2 = L \times \sum_{n=1}^{4}\sum_{m=1}^{4}(\alpha_{2L_{m,n}} \times F_{m,n}) + R \times \sum_{n=1}^{4}\sum_{m=1}^{4}(\alpha_{2R_{m,n}} \times F_{m,n})$$

$$a'_3 = L \times \sum_{n=1}^{4}\sum_{m=1}^{4}(\alpha'_{3L_{m,n}} \times F_{m,n}) + R \times \sum_{n=1}^{4}\sum_{m=1}^{4}(\alpha'_{3R_{m,n}} \times F_{m,n})$$

Knowing the angles $\alpha_1$, $\alpha_2$ and $\alpha'_{3L}$, the law of sines can be used to determine the radius of curvature. Namely the law of sines relates the lengths of the sides of a triangle to the sines of its angles. According to the triangles formed in FIGS. 4A to 4M and 5A to 5M:

$$\frac{R_{HV}}{\sin\alpha_1} = \frac{D}{|\sin\alpha'_3|}$$

$$R_{HV} = D\frac{\sin\alpha_1}{|\sin\alpha'_3|}$$

Similarly, the following results from the law of sines:

$$\frac{R_{RV}}{\sin\alpha_2} = \frac{D}{|\sin\alpha'_3|}$$

$$R_{RV} = D\frac{\sin\alpha_2}{|\sin\alpha'_3|}$$

In each case, the length of the geodesic D may be determined according to Equation (2). Recall, however, that the radius of curvature determined at the host vehicle $R_{HV}$ and the radius of curvature determined at the remote vehicle $R_{RV}$ should be equal or substantially equal. Although it is not necessary, determining both $R_{HV}$ and $R_{RV}$ can be used to indicate the quality of the data. That is, if the difference between $R_{HV}$ and $R_{RV}$ is greater than a minimum defined value (determined by experimentation, for example), it could indicate that the input data cannot be trusted to result in a correct calculation of the path length L of the curved path P. This could occur due to faulty sensors, a bad communication link, etc. However, it could also result from a sudden change in trajectory of one or both of the host vehicle and the remote vehicle to avoid an obstacle.

Path length L, that is, the length of the curved path P between the host vehicle and the remote vehicle may be determined by either of the following calculations using Equation (2) in place of D.

$$L = \alpha'_3(1-f)r_e\sqrt{\frac{(\theta_{RV} - \theta_{HV})^2\cos^2\phi_{HV} + (\phi_{RV} - \phi_{HV})^2}{\sin^2\phi_{HV} + (1-f)^2\cos^2\phi_{HV}}}\left(\frac{\sin\alpha_1}{\sin\alpha'_3}\right)$$

$$L = \alpha'_3(1-f)r_e\sqrt{\frac{(\theta_{RV} - \theta_{HV})^2\cos^2\phi_{HV} + (\phi_{RV} - \phi_{HV})^2}{\sin^2\phi_{HV} + (1-f)^2\cos^2\phi_{HV}}}\left(\frac{\sin\alpha_2}{\sin\alpha'_3}\right)$$

According to the above described, the geometric relationships developed using vehicle positions and heading angle combinations for left-hand and right-hand curves generate projected vehicle transportation network information in the form of calculation for the path length L of vehicles traveling along a curved path that does not require knowledge of whether the curved path is curving left or curving right.

Figure 6:
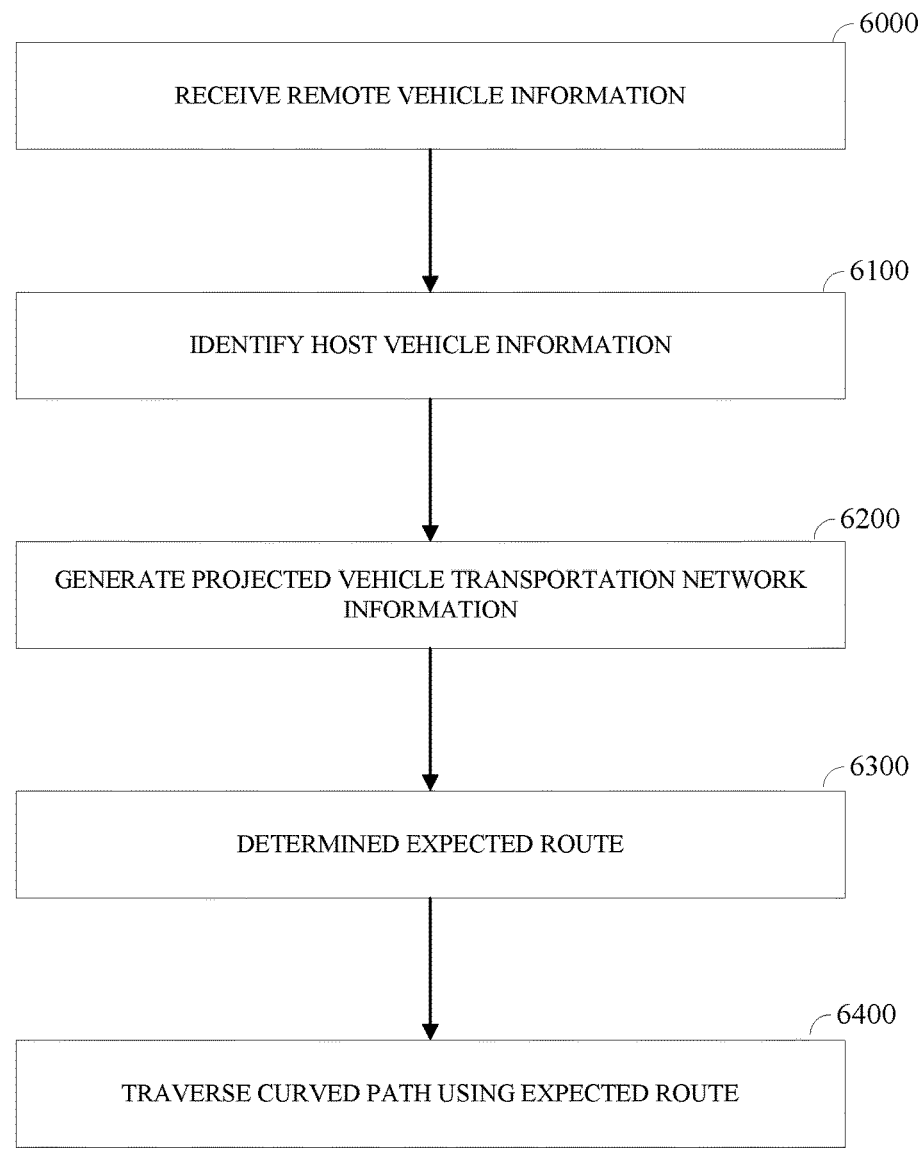
FIG. 6 is a flow chart of a method of generating projected vehicle transportation network information for use in traversing a vehicle transportation network according to the teachings herein.

FIG. 6 is a diagram of traversing a vehicle transportation network including generating projected vehicle transportation network information in accordance with this disclosure. In some embodiments, traversing a vehicle transportation network including generating projected vehicle transportation network information may be implemented in a vehicle, such as the vehicle 1000 shown in FIG. 1 or the vehicles 2100/2110 shown in FIG. 2.

In some embodiments, traversing a vehicle transportation network including generating projected vehicle transportation network information includes receiving remote vehicle information at 6000, identifying host vehicle information at 6100, generating projected vehicle transportation network information at 6200, determining an expected route at 6300 and traversing a curved path using the expected route at 6400.

Host information receives remote vehicle information while traversing a portion of a vehicle transportation network at 6000. Remote vehicle information received by a host vehicle at 6000 may be in the form of a remote vehicle message that indicates remote vehicle geospatial state information for the remote vehicle and remote vehicle kinematic state information for the remote vehicle. The remote vehicle geospatial state information may include, for example, geospatial coordinates for the remote vehicle. These coordinates may be GPS coordinates for a latitude and a longitude of the remote vehicle in some embodiments. The remote vehicle kinematic state information includes at least a remote heading angle for the remote vehicle, or information from which the remote heading angle may be determined. The remote heading angle for the remote vehicle is provided with reference to a reference direction (e.g., north). Other remote vehicle kinematic state information may be provided within the remote vehicle message as discussed initially, including remote vehicle speed, vehicle acceleration, etc. The remote vehicle information may be received according to any number of wireless electronic communication links discussed with reference to FIG. 2. The remote vehicle information may be stored in memory of the host vehicle for subsequent processing and may be stored with a time stamp.

Identifying host vehicle information occurs at 6100. For example, the host vehicle may identify host vehicle information by reading various sensors throughout the host vehicle as discussed with reference to FIG. 1. The host vehicle may transmit some of the information to the remote vehicle. The host vehicle information may include host vehicle geospatial state information for the host vehicle and host vehicle kinematic state information for the host vehicle. The host vehicle geospatial state information may include, for example, geospatial coordinates for the host vehicle. The geospatial coordinates for the host vehicle are desirably identified in the same coordinate system (e.g., GPS coordinates for a latitude and a longitude of the host vehicle) as the remote geospatial state information, but they may be identified in a different coordinate system such that one or both sets of coordinates are converted to a common coordinate system.

The host vehicle kinematic state information includes at least a host heading angle for the host vehicle. The host heading angle is provided with reference to a reference direction. Generally, this direction is north and is the same as the reference direction used to identify the remote vehicle heading angle, but this is not required. The vehicles may use different reference directions as long as the host vehicle knows the reference directions so as to convert them to a common reference direction. The reference direction does not need to be the same reference direction as used to generate the projected vehicle transportation network information. The host vehicle kinematic state information may include additional information such as host vehicle speed, host vehicle acceleration, etc.

Upon receipt of remote vehicle information and identification of host vehicle information, projected vehicle transportation network information may be generated at 6200. For example, the host vehicle may generate projected vehicle transportation network information representing a portion of the vehicle transportation network based on the remote vehicle information received at 6000 and the host vehicle information identified at 6100. This portion may include a curved path having a substantially constant radius.

In some embodiments, generating the projected vehicle transportation network information includes generating a remote radius of curvature of a travel path for the remote vehicle using the remote heading angle and the remote vehicle geospatial state information, generating a host radius of curvature of a travel path for the host vehicle using the host heading angle and the host vehicle geospatial state information, and generating the curved path using the remote radius of curvature, the host radius of curvature, and an angle between the remote radius of curvature and the host radius of curvature. The angle between the remote radius of curvature and the host radius of curvature may be, for example, facing angle $\alpha'_3$.

In some embodiments, generating the projected vehicle transportation network information includes generating a remote radius of curvature of a travel path for the remote vehicle using the remote heading angle, generating a host radius of curvature of a travel path for the host vehicle using the host heading angle, and generating a length of the curved path between the host vehicle and the remote vehicle using the remote radius of curvature, the host radius of curvature, the remote vehicle geospatial state information, the host vehicle geospatial state information, and an angle between the remote radius of curvature and the host radius of curvature. The angle between the remote radius of curvature and the host radius of curvature may be, for example, facing angle $\alpha'_3$.

In some embodiments, bad data can be detected and optionally omitted from the generation of the projected vehicle transportation network information. For example, values for the remote heading angle and the remote vehicle geospatial state information may be periodically received and/or identified. Then, the remote radius of curvature for the remote vehicle for each of the periodically received values of the remote heading angle and the remote vehicle geospatial state information with a respective host radius of curvature generated from concurrent values of the host heading angle and the host vehicle geospatial state information may be compared. When the pairs of values including a remote radius of curvature and a host radius of curvature have values that are different by more than a predetermined amount, they may be ignored or omitted. Essentially, such a difference may indicate the data is bad. If used to calculate path length, different results would occur, making it unclear what calculated path length value was correct.

In some embodiments, generating the projected vehicle transportation network information includes generating the equation for path length L discussed above with reference to FIGS. 4A to 4M and 5A to 5M.

In some embodiments, generating the projected vehicle transportation network information includes generating the path length L using the equation for the path length L discussed above with reference to FIGS. 4A to 4M and 5A to 5M.

Once the projected vehicle transportation network information is generated at 6200, it can be used to determine an expected route of the host vehicle and optionally of the remote vehicle at 6300. For example, the current position of the host vehicle along the curved path and/or the path length can be used, together with the speed of the host vehicle, to generate an expected position of the host vehicle along the curved path at a future point in time. Even when the speed and/or acceleration of the remote vehicle is not received as part of the remote vehicle information, the path length over time can be used to determine if the host vehicle is gaining on the remote vehicle and, if so, how long before they intersect on the curved path without further changes in the system.

The expected route may be used to traverse the curved path at 6400. For example, the expected route may indicate a possible collision at a future point in time with no changes in trajectory, speed and/or acceleration. In this case, traversing the curved path could involve issuing alarms to the driver of the host vehicle or taking corrective actions such as issuing braking instructions to a braking system of the host vehicle. Other corrective actions may be taken while traversing the curved path using the expected route.

The method as described by example in FIG. 6 can be repeated periodically or on demand while the host vehicle is traveling along the vehicle transportation network, and particularly while traversing a curved path within that network.

Vehicles may be traveling along a curved path within a vehicle transportation network. The teachings herein describe a relatively fast and simple way to take the radius of curvature into account when determining a distance between vehicles. For example, for a path with radius of curvature R of 200 meters, such as a freeway on-ramp, the difference between a calculated true path length L and a straight-line distance D between the host vehicle and the remote vehicle is four meters (157 meters vs. 153 meters) when the facing angle $\alpha'_3$ is 45 degrees. By eliminating this degree of difference, false alarms may be minimized, particularly where the radius of curvature is small.

The above aspects, examples and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method of generating projected vehicle transportation network information for use in traversing a vehicle transportation network, the method comprising:

receiving, at a host vehicle, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle, the remote vehicle kinematic state information including at least a remote heading angle for the remote vehicle;

identifying host vehicle information for the host vehicle, the host vehicle information including host vehicle geospatial state information and host vehicle kinematic state information for the host vehicle, the host vehicle kinematic state information including at least a host heading angle for the host vehicle;

generating, by a processor in response to instructions stored on a non-transitory computer readable medium, projected vehicle transportation network information representing a portion of the vehicle transportation network based on the remote vehicle information and the host vehicle information, the portion including a curved path having a substantially constant radius determined using the host heading angle for the host vehicle and the remote heading angle for the remote vehicle;

determining an expected host vehicle route for the host vehicle in response to generating the projected vehicle transportation network information representing the curved path; and traversing, by the host vehicle, the curved path using the expected host vehicle route.

2. The method of claim 1, wherein receiving the remote vehicle message includes:

storing the remote vehicle information in a memory of the host vehicle.

3. The method of claim 1, wherein the remote vehicle geospatial state information includes geospatial coordinates for the remote vehicle, and the remote vehicle kinematic state information includes at least one of a remote vehicle velocity for the remote vehicle or a remote vehicle acceleration for the remote vehicle.

4. A method of generating projected vehicle transportation network information for use in traversing a vehicle transportation network, the method comprising:

receiving, at a host vehicle, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle, the remote vehicle kinematic state information including at least a remote heading angle for the remote vehicle;

identifying host vehicle information for the host vehicle, the host vehicle information including host vehicle geospatial state information and host vehicle kinematic state information for the host vehicle, the host vehicle kinematic state information including at least a host heading angle for the host vehicle;

generating, by a processor in response to instructions stored on a non-transitory computer readable medium, projected vehicle transportation network information representing a portion of the vehicle transportation network based on the remote vehicle information and the host vehicle information, the portion including a curved path having a substantially constant radius;

determining an expected host vehicle route for the host vehicle in response to generating the projected vehicle transportation network information representing the curved path; and traversing, by the host vehicle, the curved path using the expected host vehicle route, wherein generating the projected vehicle transportation network information includes:

generating a remote radius of curvature of a travel path for the remote vehicle using the remote heading angle and the remote vehicle geospatial state information;

generating a host radius of curvature of a travel path for the host vehicle using the host heading angle and the host vehicle geospatial state information; and generating the curved path using the remote radius of curvature, the host radius of curvature, and an angle between the remote radius of curvature and the host radius of curvature.

5. The method of claim 4, wherein the host vehicle geospatial state information comprises Global Positioning System (GPS) coordinates for a latitude and a longitude of the host vehicle, and the remote vehicle geospatial state information comprises GPS coordinates for a latitude and a longitude of the remote vehicle.

6. The method of claim 4, wherein receiving the remote vehicle message comprises periodically receiving values for the remote heading angle and the remote vehicle geospatial state information, the method further comprising:

comparing the remote radius of curvature for the remote vehicle for each of the periodically received values of the remote heading angle and the remote vehicle geospatial state information with a respective host radius of curvature generated from concurrent values of the host heading angle and the host vehicle geospatial state information, each remote radius of curvature and host radius of curvature forming a pair of values; and generating the projected vehicle transportation network information comprises:

omitting any of the pairs of values whose value for the remote radius of curvature is different from the value for the host radius of curvature by a predetermined amount.

7. The method of claim 1, wherein generating the projected vehicle transportation network information includes:
generating a remote radius of curvature of a travel path for the remote vehicle using the remote heading angle;
generating a host radius of curvature of a travel path for the host vehicle using the host heading angle; and
generating a length of the curved path between the host vehicle and the remote vehicle using the remote radius of curvature, the host radius of curvature, the remote vehicle geospatial state information, the host vehicle geospatial state information, and an angle between the remote radius of curvature and the host radius of curvature.

8. The method of claim 1, wherein determining the expected host vehicle route for the host vehicle comprises generating an expected position of the host vehicle along the curved path at a future point in time.

9. The method of claim 1, further comprising:
identifying a remote vehicle expected path for the remote vehicle based on the remote vehicle information;
identifying a host vehicle expected path for the host vehicle based on the host vehicle information; and
determining a distance between the remote vehicle and the host vehicle along the curved path.

10. The method of claim 1, wherein generating the projected vehicle transportation network information includes, for each of a plurality of possible angular ranges for each of the remote heading angle and the host heading angle:
determining a geodesic between the host vehicle and the remote vehicle;
determining a remote radius of curvature of a travel path for the remote vehicle using the remote heading angle and an assumption regarding a curving direction of the curved path;
determining a host radius of curvature of a travel path for the host vehicle using the host heading angle and the assumption regarding the curving direction of the curved path;
determining a convergence angle of the geodesic;
determining a first host angle between the geodesic and the host radius of curvature based on the convergence angle and the host heading angle assuming the curving direction is left;
determining a second host angle between the geodesic and the host radius of curvature based on the convergence angle and the host heading angle assuming the curving direction is right;
determining a first remote angle between the geodesic and the remote radius of curvature based on the convergence angle and the remote heading angle assuming the curving direction is left;
determining a second remote angle between the geodesic and the remote radius of curvature based on the convergence angle and the remote heading angle assuming the curving direction is right;
determining a first facing angle between the remote radius of curvature and the host radius of curvature based on the first host angle and the first remote angle;
determining a second facing angle between the remote radius of curvature and the host radius of curvature based on the second host angle and the second remote angle;
determining a left probability operator using the first facing angle;
determining a right probability operator using the second facing angle;
determining at least one of a final host angle between the geodesic and the host radius of curvature based on the left probability operator and the right probability operator or a final remote angle between the geodesic and the remote radius of curvature based on the left probability operator and the right probability operator;
determining a final facing angle between the remote radius of curvature and the host radius of curvature based on the left probability operator and the right probability operator; and
determining a path length of the curved path between the host vehicle and the remote vehicle using the final facing angle and the at least one of the final host angle or the final remote angle.

11. The method of claim 10, wherein the convergence angle is an angle between the geodesic and a reference direction relative to the host vehicle in a geospatial domain.

12. The method of claim 10, wherein the final facing angle is an angle of greater than $\pi$ radians.

13. The method of claim 10, wherein determining the path length comprises determining the path length using the final facing angle, the at least one of the final host angle or the final remote angle, the remote vehicle geospatial state information and the host vehicle geospatial state information.

14. The method of claim 1, wherein generating the projected vehicle transportation network information includes:
storing the projected vehicle transportation network information as a projected vehicle transportation network information record, the projected vehicle transportation network information record including current temporal information.

15. A host vehicle comprising:
a processor configured to execute instructions stored on a non-transitory computer readable medium to generate projected vehicle transportation network information for use in traversing a vehicle transportation network by:
receiving, from a remote vehicle, via a wireless electronic communication link, a remote vehicle message, the remote vehicle message including remote vehicle information, the remote vehicle information indicating remote vehicle geospatial state information for the remote vehicle and remote vehicle kinematic state information for the remote vehicle, the remote vehicle kinematic state information including at least a remote heading angle for the remote vehicle;
identifying host vehicle information for the host vehicle, the host vehicle information including host vehicle geospatial state information and host vehicle kinematic state information for the host vehicle, the host vehicle kinematic state information including at least a host heading angle for the host vehicle;
generating projected vehicle transportation network information representing a portion of the vehicle transportation network based on the remote vehicle information and the host vehicle information, the portion including a curved path having a substantially constant radius determined using the host heading angle for the host vehicle and the remote heading angle for the remote vehicle;

determining an expected host vehicle route for the host vehicle in response to generating the projected vehicle transportation network information representing the curved path; and traversing the curved path using the expected host vehicle route.

16. The host vehicle of claim 15, wherein generating the projected vehicle transportation network information includes:

defining a direction of the curved path relative to a reference direction.

17. The host vehicle of claim 15, wherein generating the projected vehicle transportation network information includes calculating a path length between the host vehicle and the remote vehicle along the curved path by:

determining a length of a geodesic between the host vehicle and the remote vehicle;

determining a host angle between the geodesic and a host radius of curvature, the host radius of curvature based on the host heading angle;

determining a remote angle between the geodesic and a remote radius of curvature, the remote radius of curvature based on the remote heading angle;

determining a facing angle between the remote radius of curvature and the host radius of curvature based on the host angle and remote angle; and determining the path length of the curved path between the host vehicle and the remote vehicle using the host angle, the remote vehicle geospatial state information, the host vehicle geospatial state information, the length of the geodesic and at least one of the remote angle or the host angle.

18. The host vehicle of claim 17, wherein calculating a path length between the host vehicle and the remote vehicle along the curved path comprises:

determining a left probability operator that indicates whether a curving direction of the curved path relative to a reference direction is a left direction; and determining a right probability operator that indicates whether the curving direction of the curved path relative to the reference direction is a right direction; and wherein:

determining the host angle, determining the remote angle and determining the facing angle depend upon values of the left probability operator and the right probability operator.

19. The host vehicle of claim 18, wherein the processor is configured to determine a convergence angle of the geodesic; and wherein:

determining the host angle between the geodesic and the host radius of curvature comprises:

determining a first host angle between the geodesic and the host radius of curvature based on the convergence angle and the host heading angle assuming the curving direction is left;

determining a second host angle between the geodesic and the host radius of curvature based on the convergence angle and the host heading angle assuming the curving direction is right; and generating the host angle by combining the first host angle modified by the left probability operator with the second host angle modified by the right probability operator;

determining the remote angle between the geodesic and the remote radius of curvature comprises:

determining a first remote angle between the geodesic and the remote radius of curvature based on the convergence angle and the remote heading angle assuming the curving direction is left;

determining a second remote angle between the geodesic and the remote radius of curvature based on the convergence angle and the remote heading angle assuming the curving direction is right; and generating the remote angle by combining the first remote angle modified by the left probability operator with the second remote angle modified by the right probability operator; and determining the facing angle between the remote radius of curvature and the host radius of curvature comprises:

determining a first facing angle based on the first host angle and the first remote angle;

determining a first facing angle based on the first host angle and the first remote angle; and generating the remote angle by combining the first facing angle modified by the left probability operator with the second facing angle modified by the right probability operator.

20. The host vehicle of claim 18, wherein the processor is configured to:

determine the left probability operator based on a plurality of values for the facing angle assuming the curving direction is left; and determine the right probability operator based on a plurality of values for the facing angle assuming the curving direction is right.

* * * * *